United States Patent
Seyller et al.

(10) Patent No.: US 9,094,708 B2
(45) Date of Patent: Jul. 28, 2015

(54) METHODS AND SYSTEMS FOR PRIORITIZING LISTINGS BASED ON REAL-TIME DATA

(75) Inventors: Douglas Seyller, Lisle, IL (US); Michael R. Nichols, La Canada, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

(21) Appl. No.: 13/491,899

(22) Filed: Jun. 8, 2012

(65) Prior Publication Data

US 2013/0332965 A1 Dec. 12, 2013

(51) Int. Cl.
- H04N 21/431 (2011.01)
- H04N 21/488 (2011.01)
- H04N 21/422 (2011.01)
- H04N 21/482 (2011.01)

(52) U.S. Cl.
CPC ....... *H04N 21/431* (2013.01); *H04N 21/42204* (2013.01); *H04N 21/4312* (2013.01); *H04N 21/4316* (2013.01); *H04N 21/482* (2013.01); *H04N 21/488* (2013.01)

(58) Field of Classification Search
CPC .......... H04N 21/254; H04N 21/42204; H04N 21/482; H04N 21/488–21/4888
USPC ..................................................... 725/37–61
See application file for complete search history.

(56) References Cited

U.S. PATENT DOCUMENTS

| | | | |
|---|---|---|---|
| 6,177,931 B1* | 1/2001 | Alexander et al. | 725/52 |
| 6,268,849 B1 | 7/2001 | Boyer | |
| 6,536,041 B1* | 3/2003 | Knudson et al. | 725/39 |
| 2003/0208755 A1* | 11/2003 | Zimmerman | 725/34 |
| 2005/0015803 A1* | 1/2005 | Macrae et al. | 725/41 |
| 2006/0282852 A1* | 12/2006 | Purpura et al. | 725/39 |
| 2007/0238528 A1* | 10/2007 | Harris et al. | 463/42 |
| 2008/0066111 A1* | 3/2008 | Ellis et al. | 725/57 |
| 2008/0189215 A1* | 8/2008 | Travez et al. | 705/80 |
| 2009/0262137 A1* | 10/2009 | Walker et al. | 345/629 |
| 2010/0211636 A1 | 8/2010 | Starkenburg | |
| 2011/0014974 A1* | 1/2011 | Torf | 463/25 |
| 2011/0162008 A1 | 6/2011 | Aldrey | |
| 2011/0231878 A1 | 9/2011 | Hunter | |
| 2011/0246579 A1* | 10/2011 | Williams | 709/206 |
| 2012/0060094 A1 | 3/2012 | Irwin | |
| 2012/0060180 A1 | 3/2012 | Johansson | |

FOREIGN PATENT DOCUMENTS

WO    WO-2008042242    4/2008

* cited by examiner

*Primary Examiner* — Randy Flynn
(74) *Attorney, Agent, or Firm* — Ropes & Gray LLP

(57) ABSTRACT

Methods and systems for a media guidance application that can prioritize media content listings based on the real-time progression of the content associated with the listing. The media guidance application may interpret metadata concerning the progress of the content associated with the listing to determine whether or not a particular user will have, or continue to have, interest in the listing based on real-time statistical analysis.

14 Claims, 21 Drawing Sheets

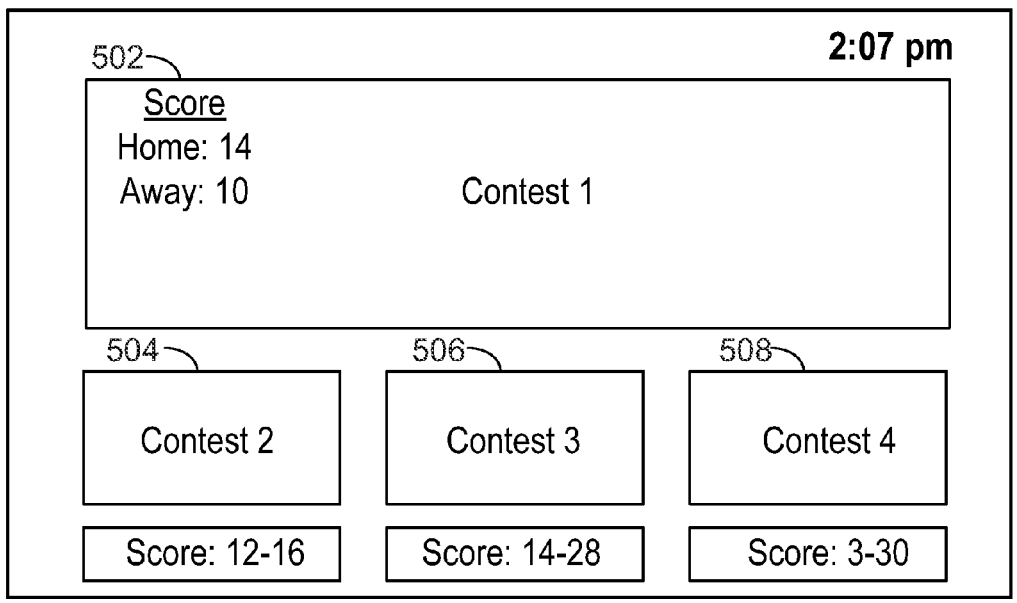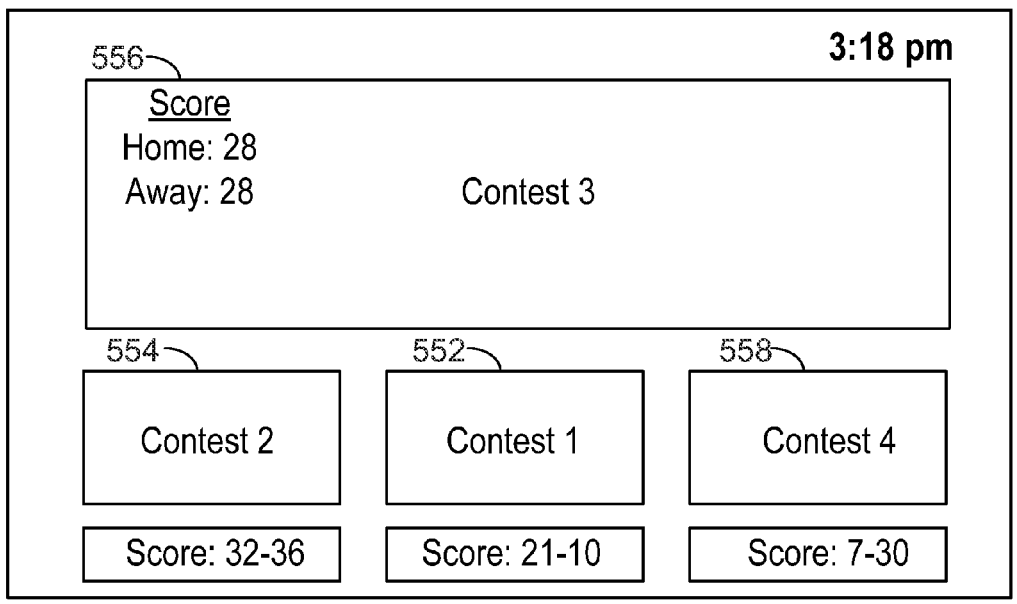
FIG. 5

900

| LISTING DATA |
|---|
| 902 `<LISTING>` |
| 904 `<CATEGORY> SPORTS </CATEGORY>` |
| 906 `<TYPE> BASKETBALL </TYPE>` |
| 908     `<TYPE_INFO>` |
| 910         `<DESCRIPTION_1> PRO </DESCRIPTION_1>` |
| 912         `<DESCRIPTION_2> MENS </DESCRIPTION_2>` |
| 914         `<DESCRIPTION_3> NATIONAL LEAGUE </DESCRIPTION_3>` |
| 916     `</TYPE_INFO>` |
| 918 `<SCORE>` |
| 920     `<HOME_TEAM> 98 </HOME_TEAM>` |
| 922     `<AWAY_TEAM> 68 </AWAY_TEAM>` |
| 924 `</SCORE>` |
| 926 `<PROGRESS>` |
| 928     `<RUNTIME> 1:40:24 </RUNTIME>` |
| 930     `<QUARTER> 4 </QUARTER>` |
| 932     `<TIME_REMAINING> 10:46 </TIME_REMAINING>` |
| 934 `</PROGRESS>` |
| 936 `</LISTING>` |

FIG. 9

| Sport | Date | Level | Home Score | Away Score | Time Remaining | Outcome |
|---|---|---|---|---|---|---|
| Basketball | 1/24/2012 | Pro | 98 | 68 | 10:46 | Home Win |
| Basketball | 12/25/2011 | Pro | 98 | 68 | 7:46 | Home Win |
| Basketball | 2/18/2011 | Non-Pro | 98 | 68 | 10:46 | Home Win |
| Football | 11/10/2011 | Non-Pro | 98 | 68 | 10:46 | Home Win |
| Basketball | 2/12/2011 | Pro | 98 | 68 | 10:46 | Home Win |
| Basketball | 1/6/2011 | Pro | 98 | 68 | 10:46 | Home Win |
| Basketball | 2/24/2009 | Pro | 98 | 68 | 10:46 | Home Win |
| Basketball | 1/2/2009 | Pro | 74 | 68 | 10:46 | Away Win |
| Basketball | 1/3/2009 | Pro | 98 | 68 | 10:46 | Home Win |
| Basketball | 2/23/2008 | Pro | 98 | 68 | 10:46 | Away Win |
| Basketball | 2/4/2008 | Pro | 98 | 68 | 10:46 | Home Win |
| Basketball | 12/24/2007 | Pro | 98 | 68 | 10:46 | Home Win |
| Basketball | 1/25/2006 | Pro | 98 | 68 | 10:46 | Home Win |
| Basketball | 2/16/2005 | Pro | 98 | 68 | 10:46 | Home Win |

| Sport | Date | Level | Home Score | Away Score | Time Remaining | Outcome |
|---|---|---|---|---|---|---|
| Basketball | 1/24/2012 | Pro | 98 | 68 | 10:46 | Home Win |
| Basketball | 2/12/2011 | Pro | 98 | 68 | 10:46 | Home Win |
| Basketball | 1/6/2011 | Pro | 98 | 68 | 10:46 | Home Win |
| Basketball | 2/24/2009 | Pro | 98 | 68 | 10:46 | Home Win |
| Basketball | 1/2/2009 | Pro | 98 | 68 | 10:46 | Home Win |
| Basketball | 2/23/2008 | Pro | 98 | 68 | 10:46 | Home Win |
| Basketball | 2/4/2008 | Pro | 98 | 68 | 10:46 | Away Win |
| Basketball | 12/24/2007 | Pro | 98 | 68 | 10:46 | Home Win |
| Basketball | 1/25/2006 | Pro | 98 | 68 | 10:46 | Home Win |
| Basketball | 2/16/2005 | Pro | 98 | 68 | 10:46 | Home Win |

| Sport | 35 | 30 | 25 | 20 | 15 | 10 | 5 | 2 | 1 |
|---|---|---|---|---|---|---|---|---|---|
| Football | 21 | 17 | 14 | 14 | 13 | 10 | 10 | 7 | 7 |
| Basketball | 15 | 8 | 8 | 7 | 7 | 6 | 6 | 5 | 5 |
| Soccer | 3 | 3 | 3 | 2 | 2 | 2 | 1 | 1 | 1 |
| Hockey | 2 | 2 | 2 | 2 | 1 | 1 | 1 | 1 | 1 |
| Lacrosse | 10 | 9 | 9 | 8 | 8 | 7 | 6 | 6 | 5 |
| Field Hockey | 8 | 7 | 6 | 6 | 4 | 4 | 4 | 3 | 3 |
| Golf | 5 | 4 | 4 | 4 | 3 | 3 | 2 | 2 | 2 |
| Wrestling | 15 | 15 | 14 | 12 | 12 | 12 | 12 | 10 | 8 |

Percentage of Scored Contest Remaining

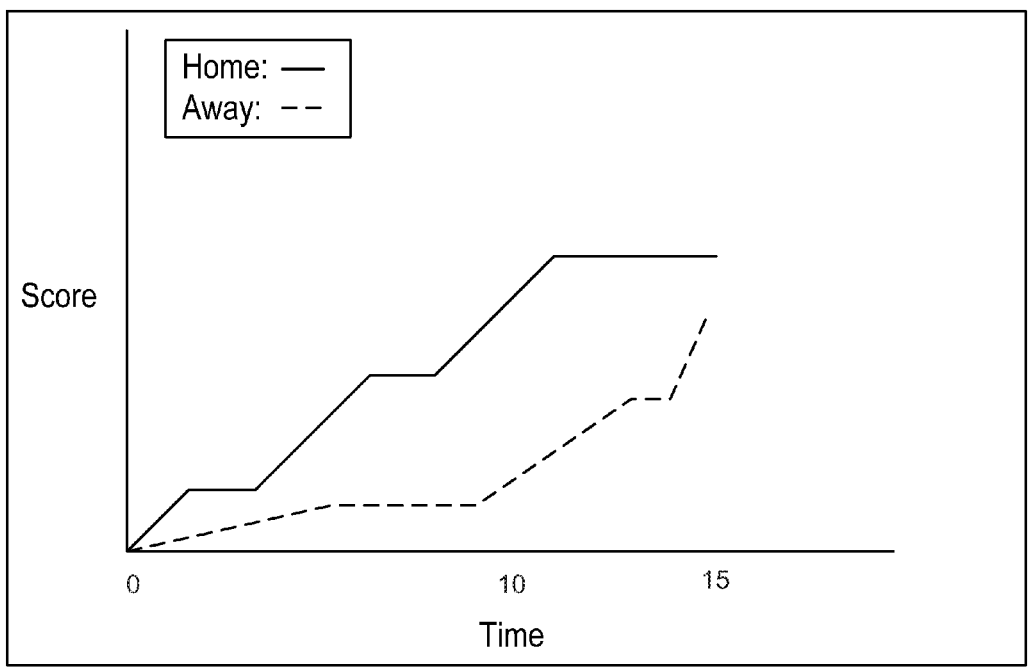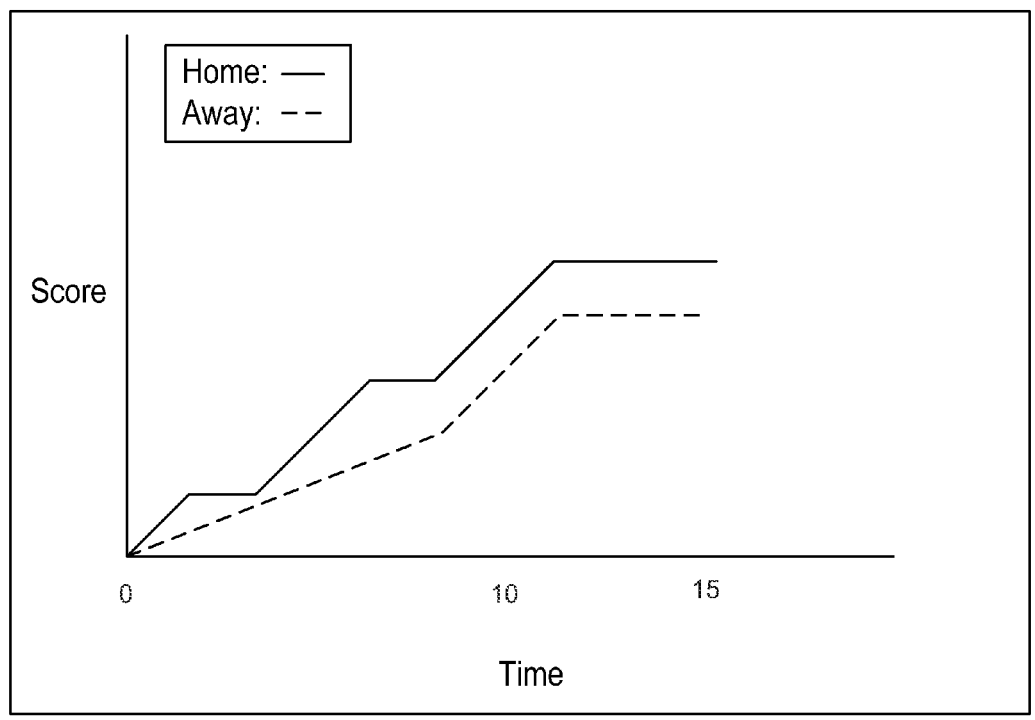
FIG. 14

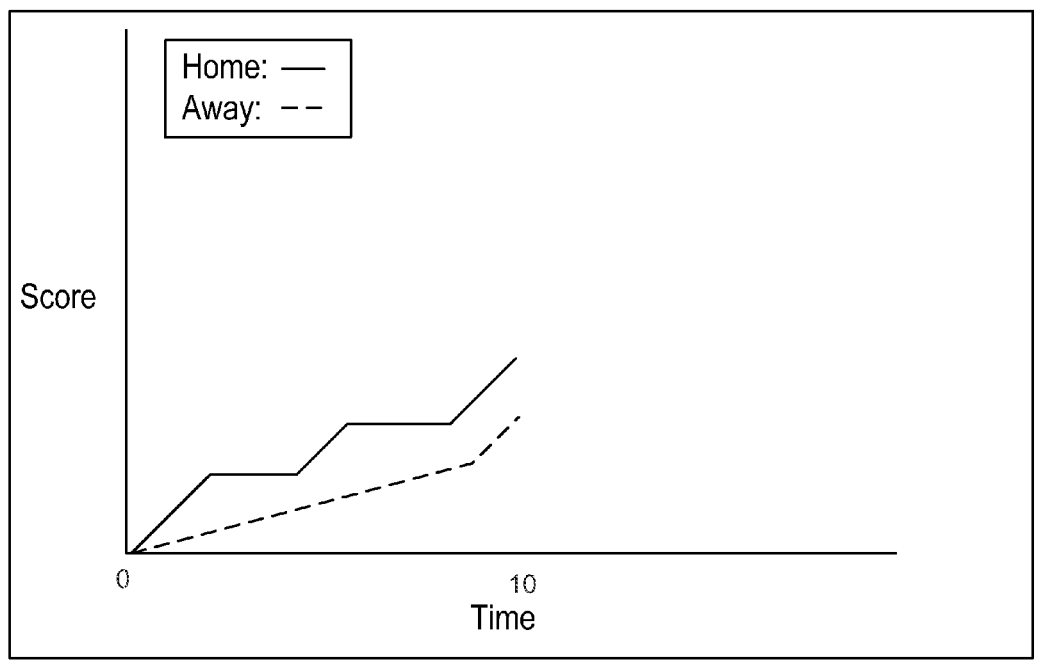
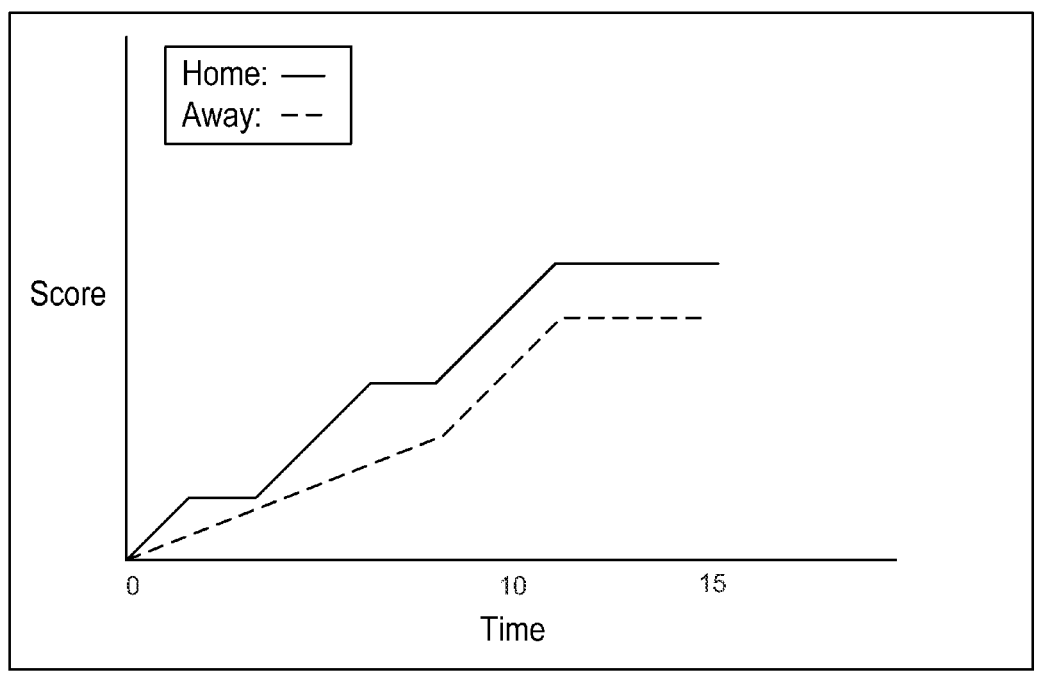
FIG. 15

METHODS AND SYSTEMS FOR PRIORITIZING LISTINGS BASED ON REAL-TIME DATA

BACKGROUND OF THE INVENTION

Conventional media systems allow users to access a plethora of media content listings. With so many media content listings, users may have difficulty reviewing all the media content listings before selecting a particular listing to watch. As such, users may often require guidance as to what particular listings to select. Therefore, conventional media systems may provide recommendations of media content listings. The media systems may utilize a user's interests to recommend particular listings in line with those interests.

The media systems may use the genres, textual descriptions, or critical reviews concerning a media content listing to determine whether or not a user will enjoy the listing. In many cases, however, a user's interest in a listing may increase or decrease as the content associated with the listing progresses. For example, while a user may be interested in a game of a particular sports team, the user's interest may wane if the team is losing badly as the game progresses. Alternatively, while a user may typically not enjoy the content of a particular listing, a surprise twist in a television show may spark the user's interest. Therefore, listings recommended by conventional media systems are not good indicators of a user's interest as the content associated with the listing progresses.

SUMMARY OF DISCLOSURE

Accordingly, methods and systems are disclosed herein for a media guidance application that can prioritize media content listings based on the real-time progression of the content associated with the listing. The media guidance application may interpret real-time data or metadata concerning the progress of the content associated with the listing and perform a real-time statistical analysis to determine whether or not a particular user will have, or continue to have, interest in the listing.

Based on real-time data or metadata received that describes the progression of the content associated with the listing, the media guidance application may determine whether or not a user is likely to be interested in a particular media content listing by extrapolating the likelihood of an outcome (e.g., one team winning a sporting contest) based on a comparison of historical data retrieved from a database. If the user is likely to be interested in the media content listing, the media guidance application may display the particular media content listing more prominently (e.g., in a larger display on the display screen) than other media content listings. Conversely, if the user is not likely to be interested in the media content listing, the media guidance application may display other media content listings more prominently.

For example, the media guidance application may display a series of listings for sports programs in response to a user's request. The media guidance application may determine by processing real-time data or metadata transmitted with the programs that one of the sports programs features the user's favorite team. However, the media guidance application may also determine via statistical analysis that in the game featuring the user's favorite team, the user's favorite team is significantly behind in points and overwhelmingly likely to lose based on a comparison of historical data of similar games retrieved from a database. Because the game is uncompetitive, the user may have little interest in watching the game as indicated by information retrieved from a user profile. Therefore, despite the game featuring the user's favorite team, the media guidance application may display other sports programs more prominently (e.g., in a larger window) than that game. Specifically, the media guidance application may display listings of games that are highly competitive (e.g., none of the competitors have a significant score advantage) as the user is likely more interested in these games.

In another example, the media guidance application may display a series of listings for drama programs. In one particular drama program, the story-line may have taken a sudden plot twist as indicated by feeds from other media (e.g., views, hits, or comments regarding the program by members of the user's social network). Due to the received information, the media guidance application may determine the user is more likely to be interested in the particular drama program. Therefore, the particular drama program may be displayed more prominently among the listings for drama programs.

In another example, the media guidance application may display a listing for reality television shows. The media guidance application may determine (e.g., by performing real-time statistical analysis of the audience size via a commercial ratings system) that an exciting part of one show is occurring (e.g., a contestant is about to be voted off the show). Therefore, the particular show may be displayed more prominently among the listings.

In addition, in some embodiments, the media guidance application may include a video mosaic of the programs associated with each program listing. For example, the program determined to be of the most interest to the user may be displayed the most prominently on the screen (e.g., the program may be displayed significantly larger than other programs, the program may be displayed in front of the other programs, the program may be displayed to the left of other programs, or any other positioning, or enhancement that draws a user's attention). In such embodiments, it may be possible for a user to watch several programs simultaneously, with the media guidance application directing the user's attention to the program currently of most interest.

In some embodiments, the media guidance application may display several programs featuring competitors or contestants. Throughout the progress of each of the programs, the media guidance application may extrapolate the likelihood that each program may achieve a particular outcome. For example, in a sports program, the media guidance program may determine the likelihood that one team will defeat the other. In an awards presentation, the media guidance application may determine the likelihood that a particular contestant will win an award. Based on these likelihoods, the media guidance application may display the listings in a particular order.

To calculate the likelihood of a particular outcome, the media guidance application may retrieve real-time data or metadata associated with the progress of the program (e.g., the current score and the time remaining in a sports program). The media guidance application may further receive the type of the program (e.g., professional men's basketball). By processing the real-time data or metadata associated with the program (e.g., comparing the current score and time remaining to historical data regarding basketball games with the same score and time remaining), the media guidance application may extrapolate the likelihood of a particular outcome (e.g., the winning team in a game with the same score and with the same time remaining proceeds to win the game ninety percent of the time).

To determine that a program is of a particular type, the program may retrieve a type indicator from the real-time data or metadata of the program (e.g., an indication that the program is a basketball game located in the metadata of the program). In addition, the information about the progress of the game may also be retrieved from the data associated with the program (e.g., an indication of the score of the basketball game located in the metadata of the program). In some embodiments, data associated with the program may arrive from different mediums (e.g., data is received via the internet and a cable provider).

In some embodiments, the media guidance application may process the received data using one or more data structures (e.g., using a lookup table to determine historical winning percentages). In some embodiments, the media guidance application may compare a likelihood of a particular outcome of a particular program to a threshold likelihood to determine how the particular program is displayed. In some embodiments, the media guidance application may also retrieve a score threshold based on the type of the program, and compare the difference between the competitors' scores in a contest to the score threshold.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 shows an illustrative media listing display that may be used to display media content options and the adjustment of the display of media content options in accordance with some embodiments of the disclosure;

FIG. 9 shows an exemplary data structure for data associated with a listing in accordance with some embodiments of the disclosure;

FIG. 10B shows an exemplary data structure for historical data related to the data associated with a listing in accordance with some embodiments of the disclosure;

FIG. 10C shows an exemplary data structure for the likelihood of an outcome related to the data associated with a listing in accordance with some embodiments of the disclosure;

FIG. 12B shows an exemplary data structure for particular score thresholds related to the data associated with a listing in accordance with some embodiments of the disclosure;

FIG. 14 is an illustrative graph used to describe some embodiments of a media guidance application used to display media content listings in accordance with some embodiments of the disclosure;

FIG. 15 is an illustrative graph used to describe some embodiments of a media guidance application used to display media content listings in accordance with some embodiments of the disclosure;

DETAILED DESCRIPTION OF DRAWINGS

Figure 1:
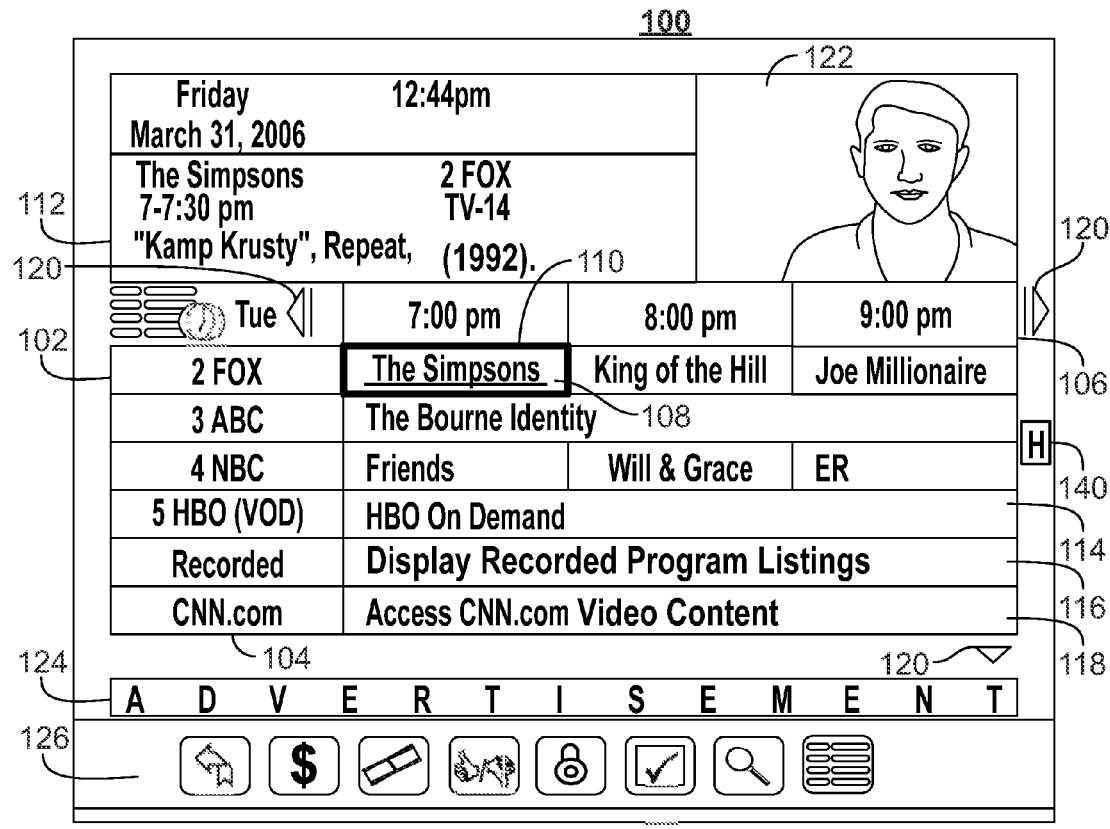
FIG. 1 shows an illustrative media listing display that may be used to display media content listings in accordance with some embodiments of the disclosure.

Methods and systems are disclosed herein for a media guidance application that can prioritize media content listings based on the real-time progression of the content associated with the listing. The media guidance application may interpret real-time data or metadata concerning the progress of the content associated with the listing to determine whether or not a particular user will have, or continue to have, interest in the listing based on real-time statistical analysis.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, interactive media guidance application, a media guidance application, or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among, and locate many types of, content or media assets. Interactive media guidance applications may generate graphical user interface screens that enable a user to navigate among, locate, and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

In some embodiments, the media guidance application may sort video assets into categories. The term "categories" as used herein, relate to particular listings that relate to each other according to a user's interest. A user may wish to watch simultaneously, compile in a set of listings, or monitor more closely listings in a category. For example, a user may use the media guidance application to monitor all sports programs currently being shown. In another example, a user may watch all programs featuring a particular sport using the media guidance application. In another example, the media guidance application may list all the programs featuring sports teams from a particular location. In another example, a user may monitor all video assets featuring a particular actress or celebrity using the media guidance application. In another example, a user may watch several game shows on a single screen simultaneously. In another example, a user may monitor several news broadcasts simultaneously using the media guidance application. In another example, a user may monitor all programs of a particular genre using the media guidance application.

In some embodiments, the media guidance application may display listings for different categories of video assets. Upon selection of a particular category, the media guidance application may display all listings in a particular category. In some embodiments, the listings that are displayed may be accompanied by the display of the video assets associated with each listing.

In some embodiments, the category may include scored contests. As used herein, the term "scored contest" means a program featuring competitors or contestants competing for an award(s) and/or goal(s) according to particular rules and/or scoring systems. Scored contests may include sports, game shows, award ceremonies, countdowns, or other events. The competitors in a scored contest may be one or more people, products, services, or ideas. In some embodiments, the category may include non-scored contests. As used herein, the term "non-scored contest" means a program that is not a scored contest. In some embodiments, a category may include both scored contests and non-scored contests.

In some embodiments, a particular category may include only listings of a particular type. In some embodiments, a category may include listings of multiple types. As referred to herein, the type of a listing refers to listings having a subject matter characteristic used to distinguish the subject matter of the listing from the subject matter of another listing. For example, the type of a sports program may be the particular sport featured in the sports program such as basketball or football.

The type of a listing may be determined by processing type information. As used herein, the term "type information" means data or information used to indicate the type of the listing. Type information may be processed, or used in correlation with other information, by the media guidance application to calculate an outcome related to the listing. Type information may indicate the particular rules, scoring system, circumstances, league, participants, sponsor, or any other information regarding the subject matter of the listing. For example, the type of a sports program may depend on type information such as whether or not the featured sport is professional or non-professional, men or women, a particular division, league or organization, or other information that may affect the calculation of the outcome.

The type of a listing may be identified by the media guidance application by a type identifier transmitted with the listing (e.g., transmitted in the real-time data associated with, or the metadata of, the listing such as in the vertical blanking interval of the transmission). As used herein, the term "type identifier" may include anything used by the media guidance application to identify the type of the listing. The type identifier may include a portion or all of the type information.

In some embodiments, the media guidance application may process a real-time data feed associated with the first scored contest to determine the first score at a point of progress of a scored contest. The real-time data feed may include real-time data. As used herein, "real-time data" refers to data received by the media guidance application, which describes the current state (e.g., the current score, current point of progress, current occurrences in the contest) of the media content of the listing. In some embodiments, the real-time data may include information received from other media, recent news, rumors, recommendations, observations, compilations or correlations of data derived from one or more sources. In some embodiments, the real-time data may be received from the same source as the media content and/or the media guidance application. In some embodiments, the real-time data may be received from different sources from the media content and/or the media guidance application. For example, the real-time data may be received from a real-time data source (e.g., real-time data source 424 (FIG. 4)).

As used herein, the term "outcome," refers to a particular scenario, event, and/or circumstance resulting at the conclusion of the progression of the content associated with the listing. For example, if the listing is for a scored contest, the scenario, event, and/or circumstance may refer to a particular contestant winning or losing; may refer to a particular contestant achieving a particular score, or a particular score relative to another contestant; or may refer to the standing of the participants in the contest will not change from the current standing of the participants at the current point in the progression of the scored contest. The particular outcome for which a user is interested in may be determined by the user or the media guidance application.

In another example, if the listing is not a scored contest, the scenario, event, and/or circumstance may refer a particular story line or plot point occurring; may refer to a particular rating being achieved (e.g., by a rating system that determines audience viewing habits during the progression of a program such as audience measurement systems developed by the Nielsen Company); may refer to the appearance of particular characters, actors, and/or themes; or may refer to any other characteristic of the program, which may interest the user.

In some embodiments, the media guidance application may determine the particular likelihood of an outcome occurring. To calculate the likelihood, the media guidance application may compare score information transmitted with the listing (e.g., metadata or real-time data) to historical information (e.g., information relating to past scenarios, events, and/or circumstances that may be indicative of current or future scenarios, events, and/or circumstances). The media guidance information may also use information received from other media, recent news, rumors, recommendations, observations, compilations or correlations of data derived from one or more sources. The likelihood of an outcome may be expressed in numerous ways. In some embodiments, the media guidance application may express the likelihood as a value. For example, the value may be expressed as a percentage, fraction, ratio, or whole number.

In some embodiments, the media guidance application may extrapolate a likelihood that the first scored contest will have a first outcome based, at least in part, on a cross-referencing of the score of a scored contest with outcome determination criteria. As used herein, "outcome determination criteria" refers to criteria indicative of a scored content having a particular outcome. In some embodiments, outcome determination criteria may include, but is not limited to, historical outcomes of historical scored contests of a same type as the first scored contest with the same score as the first scored contest at the same point of progress of the first scored contest.

For example, if a scored contest is of a particular sporting event, the media guidance system may determine the type of the scored content (e.g., professional men's basketball game). The media guidance system may then proceed to retrieve the score information such as the current score of the scored contest (e.g., the score of each team competing in the basketball game) and the progress information such as the current point in the progress of the scored contest (e.g., the current time of the play time of the game). The media guidance system may then compare the score at the point in the progress of the scored contest to historical scored contests of the same type (e.g., previous professional men's basketball games) with the same score (the score of each team competing in the previous basketball games are the same as the scores of each team in the current game) at the same point in the progress of historical scored contests (e.g., the current time of the game time of the game is the same as the time of the game time of the historical games).

In some embodiments, outcome determination criteria may include, but is not limited to, score thresholds of a particular type of a scored contests. For example, the media guidance application may determine the average number of points scored historically during the time remaining in the scored contest, the average number of points scored historically by the teams currently playing, the average number of points scored historically by all teams that have ever played, the mathematical amount of points that may be scored in the time remaining, or any other suitable method, or combination of, for determining the amount of points that may be scored by a competitor in the time remaining in the scored contest. Based on this information, the media guidance application may determine a score threshold. As used herein, a "score threshold" is a difference in the scores of competitors in a scored contest, which predicts a particular outcome (e.g., one team winning the scored contest) with a particular precision (e.g., a ninety percent likelihood).

In some embodiments, the media guidance application may, upon determining a type of the first scored contest, retrieve a score threshold for the type of the contest at the current point in the progress of the scored contest. The value of the score threshold may be based on the type of scored contest (e.g., whether the scored contest is a basketball or football game) as shown below in FIG. 12B or other causes including, but not limited to, the level of interest that the user has in a particular contestants, the characteristics of the participants (e.g., whether or not the participants have an affinity for rapidly scoring, or losing, points during, or at the end of, a game), the characteristic of the scored contest (e.g., whether or not the scored contest is frequented by points rallies or changes to its scoring system such as a game show with a "lightning round" or round where the points awarded are doubled), and/or occurrences during the scored contest (e.g., the injury to a key player). After comparing a difference between the scores of two competitors in the scored contest, the media guidance application may determine that the difference exceeds a score threshold (e.g., a score threshold based on data structure 1250 (FIG. 12B)).

In some embodiments, the level of precision required (e.g., the percentage of likelihood) may also be adjusted and/or determined by the media guidance application. For example, the level of precision required may be higher for scored contest for which the user has more interest (e.g., scored contest featuring the user's favorite teams or scored contests featuring playoffs or important games) based on the user's profile.

For example, in a particular scored contest, the media guidance application may determine that the current difference in points between two competitors is ten points. The media guidance application may refer to a database of score thresholds for this particular type of scored contest and filter the results based on the point of progress of the scored contest. The information retrieved from the database may indicate that at the current point or progress of the scored contest, a difference of eight points indicates that the winning team is likely (e.g., has a ninety percent likelihood) to win the contest. In this case, the score differential (e.g. ten points) of the particular scored contest exceeds the score threshold (e.g., eight points). Therefore, the media guidance application may determine this particular scored contest has a high likelihood (e.g., greater than ninety percent) of an outcome and demote the listing associated with the scored contest in the display of listings.

In some embodiments, the media guidance application may periodically or continually extrapolate the likelihood of each outcome of a listing. This may also include extrapolating the likelihood of each outcome or each listing in a category displayed by the media guidance application. In some embodiments, the media guidance application may extrapolate the likelihood of each outcome upon detecting a change that may affect the outcome (e.g., the scoring of points by one competitor, the change in the amount of time remaining, and/or the occurrence of a particular event).

In some embodiments, the media guidance application compares information of a particular kind (e.g., category, type, score, progress, etc.) to another particular kind (e.g., historical, user profile, etc.). To compare the different kinds of information the media guidance application may use multiple types of object recognition, including fuzzy logic. For example, the particular information may be found in a data field that may be a textual data field. Using fuzzy logic, the system may determine two fields to be identical (or different) even though the substance of the data field (e.g., two different spellings) is not identical. In some embodiments, the media guidance application may analyze particular data fields of the first kind of information and the second kind of information for particular values or text. The data fields could be associated with categories, genres, series, episodes, products, traits, ratings, targeted audiences, textual descriptions, or any other suitable indicator that may be used to determine a category, type, score, progress, history or interest of the user. Furthermore, the data fields could contain values (e.g., the data fields could be expressed in binary or any other suitable code or programming language). Other suitable methods for comparing data are also contemplated by this disclosure.

In some embodiments, the order of the listings as appearing on a display screen of a user equipment device may change based on the likelihoods of a particular outcome. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smart phone, or any other television equipment, computing equipment, wireless device, or any device comprising a display screen, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

In some embodiments, the order of the listings as appearing on a display screen of the user equipment device may change based on the likelihood of a particular outcome. The media guidance application may position one listing above, below, in front of, behind, to the side of, at an angle to, or in various combinations with respect to, another listing. In addition, the media guidance display may enlarge or shrink one listing in regards to another listing. Furthermore, if the listing is accompanied by the display of a video asset or any other information, the video asset and/or the accompanying information may be altered in the same, or different, manner as the listing. For example, if the media guidance application displays a series of video assets, the positioning of the video assets, with respect to one another may be altered in any way, or combination of ways, described in this paragraph.

In some embodiments, the media guidance application may additionally base the order of listings, at least in part, on additional factors. As used herein, the term "additional factors" means characteristics of a listing, other than the likelihood of an outcome, which may affect the interest a user has in the listing. For example, additional factors may include, but are not limited to, the characteristics of the participants (e.g., whether or not the participants have are rapidly scoring, or losing, points during, or at the end of, a game; whether or not the participants are of particular interest to the user), the characteristic of the scored contest (e.g., whether or not the scored contest is experiencing a rally or change to its scoring system such as a game show with a "lightning round" or round where the point awarded are doubled; whether or not the scored contest is of particular interest to the user such as a play-off or overtime game), occurrences during the scored contest (e.g., the injury to a key player), and/or the presence of portions likely to be of more interest to the user (e.g., the elimination segment of a reality television show).

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
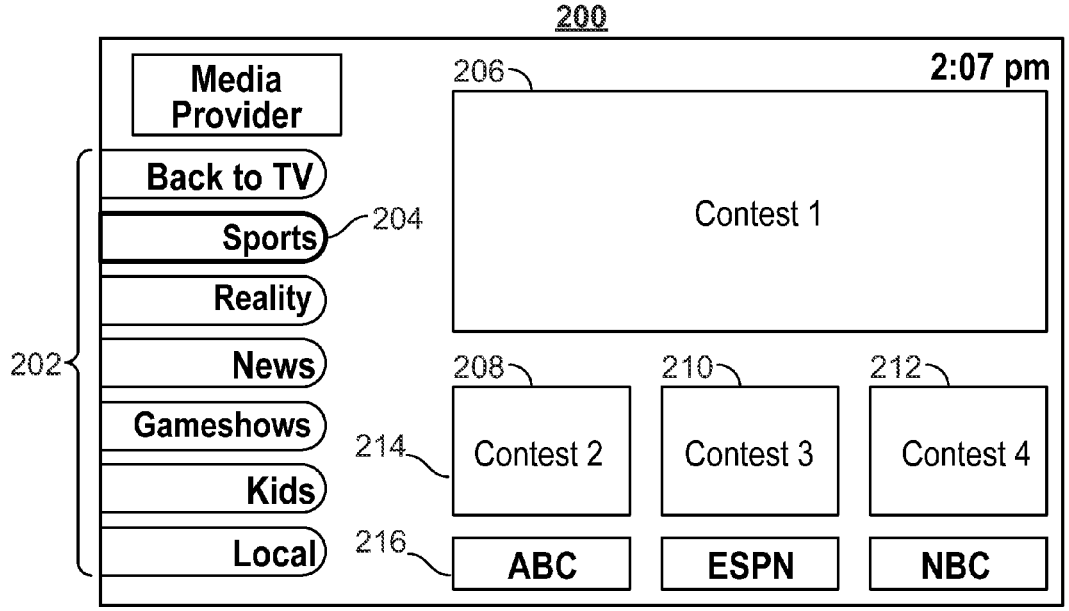
FIG. 2 shows an illustrative media listing display that may be used to display media content listings in accordance with some embodiments of the disclosure.

FIGS. 1-2 show illustrative display screens that may be used to provide media guidance data. The display screens shown in FIGS. 1-2, 5 and 19 may be implemented on any suitable user equipment device or platform. While the displays of FIGS. 1-2, 5 and 19 are illustrated as full screen displays, they may also be fully or partially overlaid over content being displayed. In addition, the displays of FIGS. 1-2, 5 and 19 may implement mosaic displays, which display one or more video assets at any one time. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, user profile information, or data about the progression of the media content.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences or a user profile. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. As used herein, a user profile, is a compilation of interests of a user generated by the user and/or a third party. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. Selectable options 202 may represent different categories of listings in the video mosaic display 200. In display 200, sports option 204 is selected, thus providing listings 206, 208, 210, and 212 as the displayed listings, which each display a sports program (e.g., a scored contest). In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing, either in listings 206, 208, 210, and 212 or in another portion of display 200. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. For example, the media guidance application may accentuate the listing based on a likelihood associated with an outcome. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
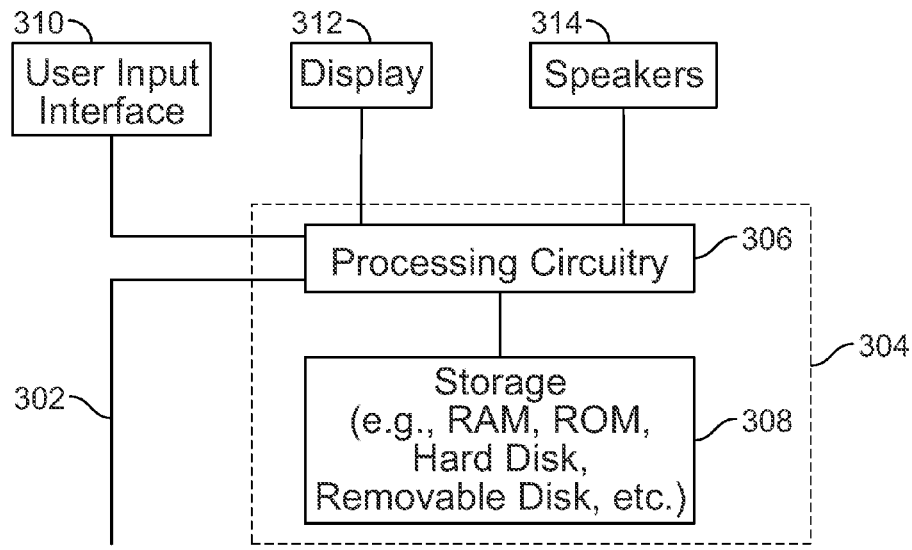
FIG. 3 is a block diagram of an illustrative user equipment device in accordance with some embodiments of the disclosure.

Users may access content and the media guidance application (and its display screens featuring listings described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
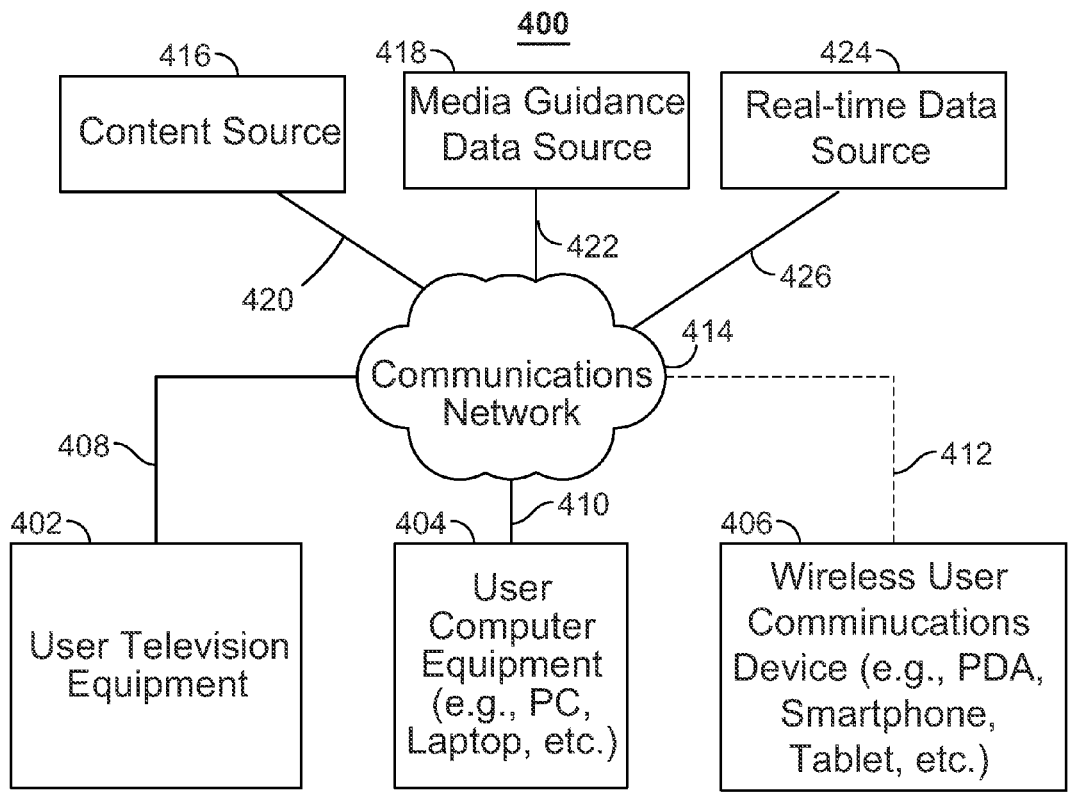
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416, media guidance data source 418, and real-time data source 424 coupled to communications network 414 via communication paths 420, 422 and 426, respectively. Paths 420, 422 and 426 may include any of the communication paths described above in connection with paths 408, 410, and 412. Communications with the content source 416, media guidance data source 418, and real-time data source 424 may be exchanged over one or more communications paths, but are shown as a single path in FIG. 4 to avoid overcomplicating the drawing. In addition, there may be more than one of each of content source 416, media guidance data source 418, and real-time data source 424, but only one of each is shown in FIG. 4 to avoid overcomplicating the drawing. (The different types of each of these sources are discussed below.) If desired, content source 416, media guidance data source 418, and real-time data source 424 may be integrated as one source device. Although communications between sources 416, 418, and 424 with user equipment devices 402, 404, and 406 are shown as through communications network 414, in some embodiments, sources 416, 418, and 424 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S.

Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed).

Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server.

For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider.

Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Real-time data source 424 may be any source or equipment capable of providing real-time data to the media guidance application. Real-time data source 424 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Real-time data source 424 may be the originator of content (e.g., a television broadcaster, a Webcast provider, etc.) or may not be the originator of content (e.g., an on-demand content provider, an Internet provider of content of broadcast programs for downloading, etc.). Real-time data source 424 may include cable sources, satellite providers, on-demand providers, Internet providers, over-the-top content providers, or other providers of content. Real-time data source 424 may also include a remote media server used to store different types of content (including video content selected by a user), in a location remote from any of the user equipment devices.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices.

For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, which provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

FIG. 5 shows two illustrative displays of some embodiments of the disclosure. It should be noted that display 500, display 550 or any component thereof, could be displayed on, or provided by, any of the devices shown in FIGS. 3-4. For example, display 500 and display 550 may be displayed on user equipment 402, 404, and/or 406 (FIG. 4)). Display 500 includes listings 502, 504, 506, and 508, each of which is a scored contest. Display 550 includes listings 552, 554, 556, and 558, each of which is a scored contest. Display 500 and display 550 are products of the same media guidance application shown roughly an hour later as indicated by the time shown in display 500 (indicating a time of "2:07 pm") and time shown in display 550 (indicating a time of "3:18 pm").

Display 500 shows listing 502 (identified as "Contest 1"), listing 504 (identified as "Contest 2"), listing 506 (identified as "Contest 3"), and listing 508 (identified as "Contest 4"). As shown in listing 502, contest one currently has a score of fourteen to ten. As shown in listing 504, contest two currently has a score of twelve to sixteen. As shown in listing 506, contest three currently has a score of fourteen to twenty-eight. As shown in listing 508, Contest four currently has a score of three to thirty.

Display 550 shows listing 552 (corresponding to listing 502) listing 554 (corresponding to listing 504), listing 556 (corresponding to listing 556), and listing 558 (corresponding to listing 558). As shown in listing 552, contest one currently has a score of twenty-one to ten. As shown in listing 554, contest two currently has a score of thirty-two to thirty-six. As shown in listing 556, contest three currently has a score of twenty-eight to twenty-eight. As shown in listing 558, contest four currently has a score of seven to thirty.

In some embodiments, the order of listings 502, 504, 506, and 508 in display 500 may be the result of an initial default settings of the media guidance application. In some embodiments, the order of listings of listings 502, 504, 506, and 508 may have been determined by a user (e.g., via user input interface 310 (FIG. 3)). For example, the order of listings 502, 504, 506, and 508 may reflect a user's interests in each of the respective contests associated with the listings. In some embodiments, the order of listings 502, 504, 506, and 508 may reflect the likelihoods of particular outcomes as determined upon activation of the media guidance application by the user.

The order and position of the listings 552, 554, 556, and 558 in display 550 has changed from the order and position of the corresponding listings 502, 504, 506, and 508 in display 500. The change in order and position reflects some embodiments of the media guidance application as the media guidance application has re-ordered and re-positioned the listings 552, 554, 556, and 558 in display 550, which may reflect the interests of the user. For example, the media guide application displays listing 556 more prominently (and in a larger size) than listings 554, 552, and 558 due to listing 556 as being a more competitive contest (e.g., the current score is tied) than listings 554, 552, and 558.

Furthermore, listing 554 is positioned before listing 552 moving left to right. This may reflect that listing 554 (e.g., the score differential is four points) is associated with content that is more competitive than content associated with listing 552 (e.g., the score differential is fourteen points). Likewise, listing 558 reflects content that is the least competitive (e.g., the point differential is twenty-three points). The listings and the data associated with the listings (e.g., the current score in the scored contest of each listing) may be received from content source 416 (FIG. 4) and/or media guidance source 418 (FIG. 4). The content source 416 (FIG. 4) and/or media guidance source 418 (FIG. 4) may also generate the instructions for re-ordering and/or re-positioning the listings as described below.

For example, listings 502, 504, 506, and 508 may all relate to scored contests of the same sport, such as football. Based on the scoring system associated with football, the media guidance application may determine the likelihood that a particular team in each of the games associated with the listings will win, as discussed in more detail in regards to FIG. 11. The media guidance application may use the likelihoods to determine the order in which the listings 502, 504, 506, and 508 appear on the display 500. As the games progress, the media guidance application may re-order listings 502, 504, 506, and 508 on display 500 as the likelihood associated with each outcome for each listing changes.

Figure 8:
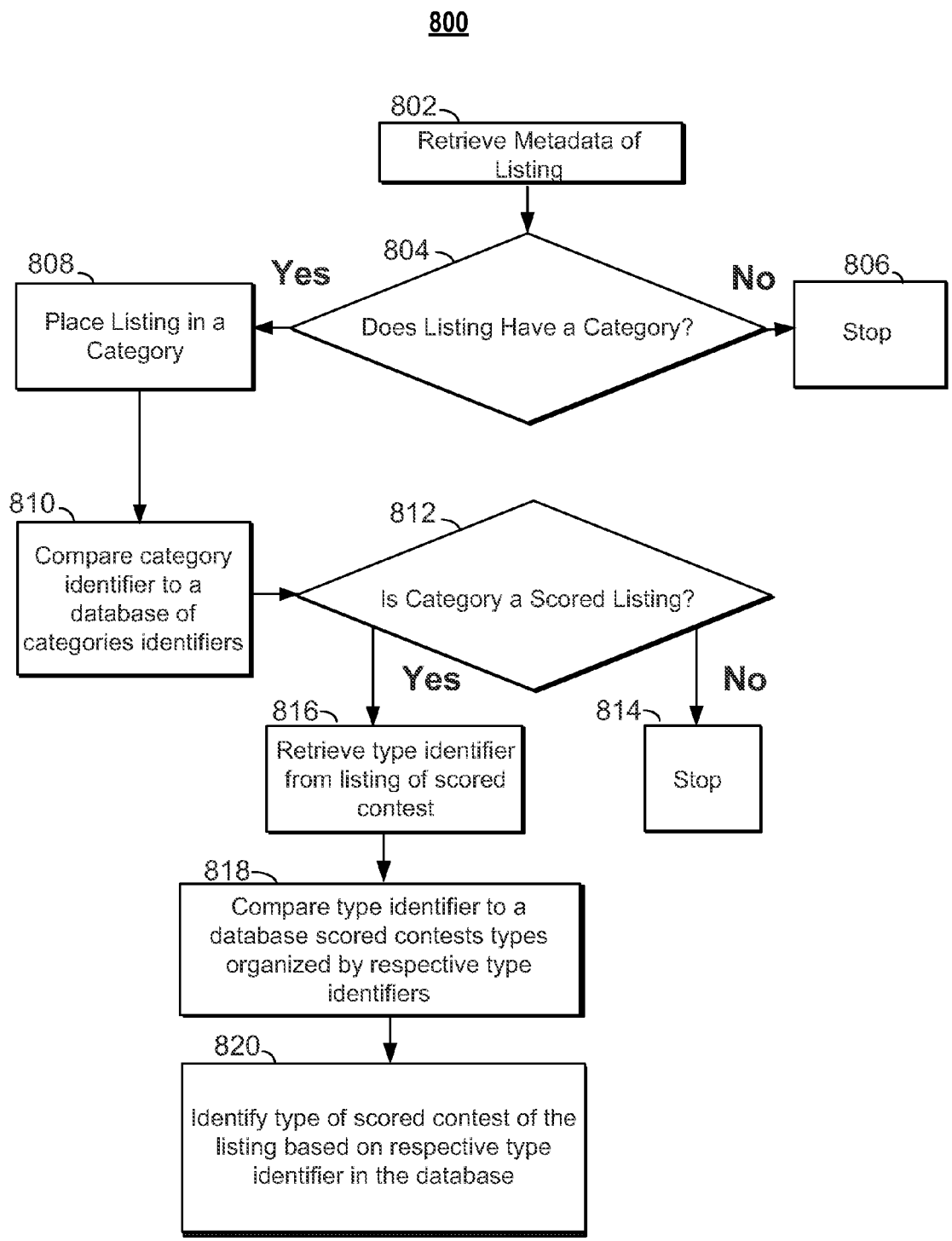
FIG. 8 is a flow-chart of illustrative steps involved in using a media guidance application to display media content listings and to identify a type of scored contest of the listing in accordance with some embodiments of the disclosure.

In some embodiments, the information used to determine the type, score and progress of the content associated with each listing may be transmitted in data associated with the listing as discussed in more detail in relation to FIG. 8. For example, contest one of listing 502 may be a football game, as determined by the type information, where one team currently has a score of fourteen and the other team currently has a score of ten, as determined by the score information. In addition, the current progression of the game (e.g., four minutes remaining in the game) may be determined by the progress information. In some embodiments, the type information, score information and progress information is obtained as described in relation to FIG. 9 below.

In some embodiments, the media guidance application determines other information (e.g., the scoring system) based on the type information. For example, the media guidance application may determine that according to the rules of football the team with a higher score wins as opposed to golf where the competitor with the higher score loses. In some embodiments, as discussed in more detail in relation to FIG. 12A, the order of listings 552, 554, 556, and 558 in display 550 may also depend on a score threshold (e.g., a score threshold based on data structure 1250 (FIG. 12B)). The media guidance application may determine the difference between the scores of the competitors (e.g., two teams) in a scored contest. Based on the difference, the media guidance application may extrapolate the likelihood of an outcome, which may trigger a re-ordering of the listings. For example, in one listing of a particular sport (e.g., a football game), a difference of seven points may indicate the game is still competitive; however, in a second listing of a different sport (e.g., a baseball game), a difference of seven runs may indicate the game is not competitive. Therefore, the listings associated with these games may have different thresholds.

In some embodiments, the media guidance application may use a threshold likelihood to order listings 552, 554, 556, and 558 in display 550. The media guidance application may determine that the likelihood of one competitor winning the scored contest is so low that the scored contest is no longer of interest to the user (e.g., if the user does not enjoy to watch non-competitive games as indicated by the user profile). Therefore, upon determining that the threshold likelihood is achieved, the media guidance application may demote the position of the associated listing in the display of listings. For example, listing 508 in display 500 may represent a football game. In the football game, one team has three points and the other team has thirty points. The likelihood of the team with thirty points winning may exceed the threshold likelihood. Therefore, the media guidance application may demote listing 508 to the least prominent position (e.g., the right hand bottom corner in display 500).

In another example, listing 502 in display 500 may represent a football game. In the football game, one team has fourteen points and the other team has ten points. The likelihood of either team winning may not exceed the threshold likelihood. Therefore, the media guidance application promotes listing 502 to the most prominent position (e.g., the top and largest-sized position in display 500).

In some embodiments, where display 500 includes both listings of scored contests and non-scored contests, the order of the listings (e.g., listings 502, 504, 506, and 508) may be determined by the interests of the user based on information in the user profile as discussed in relation to FIG. 17 below.

Figure 6:
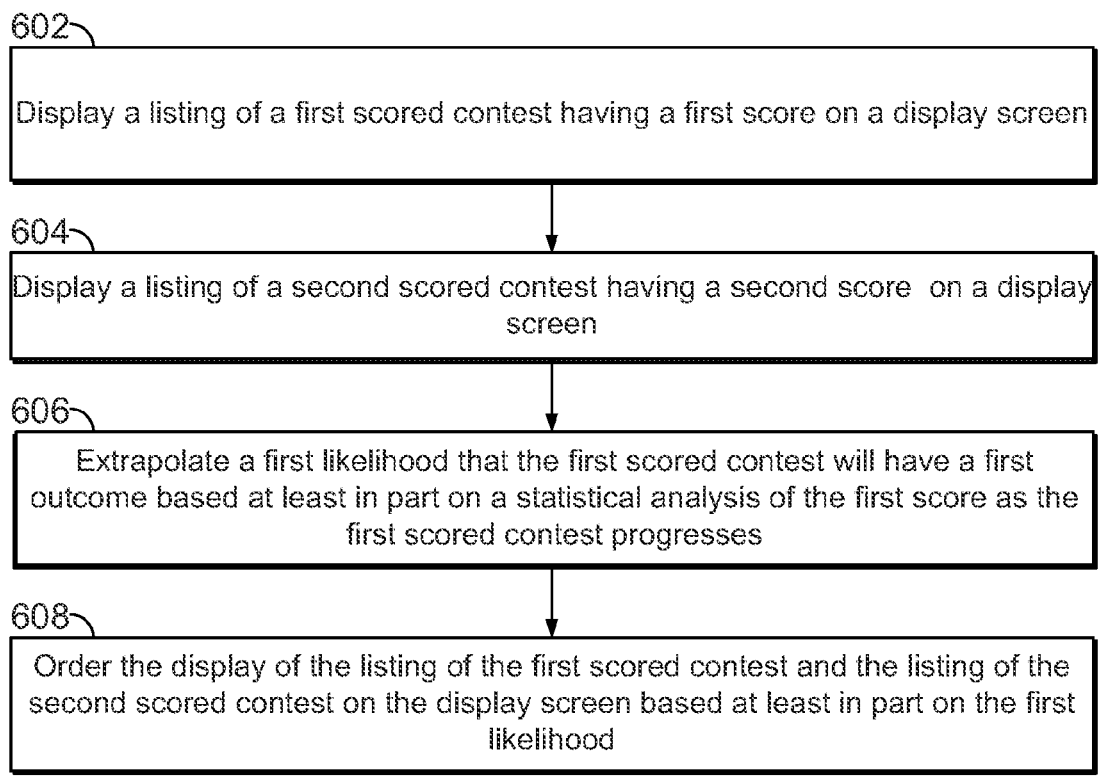
FIG. 6 is a flow-chart of illustrative steps involved in using a media guidance application to display media content listings in accordance with some embodiments of the disclosure.

FIG. 6 is a flow-chart of illustrative steps involved in using a media guidance application to order the display of media content listings in accordance with some embodiments of the disclosure. It should be noted that process 600 or any step thereof, could be displayed on, or provided by, any of the devices shown in FIGS. 3-4. In addition, process 600 or any step thereof, may be performed in real-time. For example, process 600 may be executed by control circuitry 304 as instructed by the media guidance application.

At step 602, process 600 displays a listing of a first scored contest (e.g., a football game) having a first score. For example, process 600 may display listing 502 (FIG. 5). At step 604, process 600 displays a listing for a second scored contest (e.g., another football game, or alternatively, a basketball game) having a second score. For example, process 600 may display listing 504 (FIG. 5). The display of listings in steps 602 and 604 of process 600 may occur on user equipment 402, 404, and/or 406 (FIG. 4). The video assets, if any, and metadata associated with the listings may be received from content source 416 (FIG. 4) via the communications network 414 (FIG. 4). Real-time data, if any, may be received from real-time data source 424 (FIG. 4) via the communications network 414 (FIG. 4). The media guidance application may be located locally at user equipment 402, 404, and/or 406 (FIG. 4) or may be located at media guidance data source 418 (FIG. 4) and accessed via the communications network 414 (FIG. 4).

Figure 7:
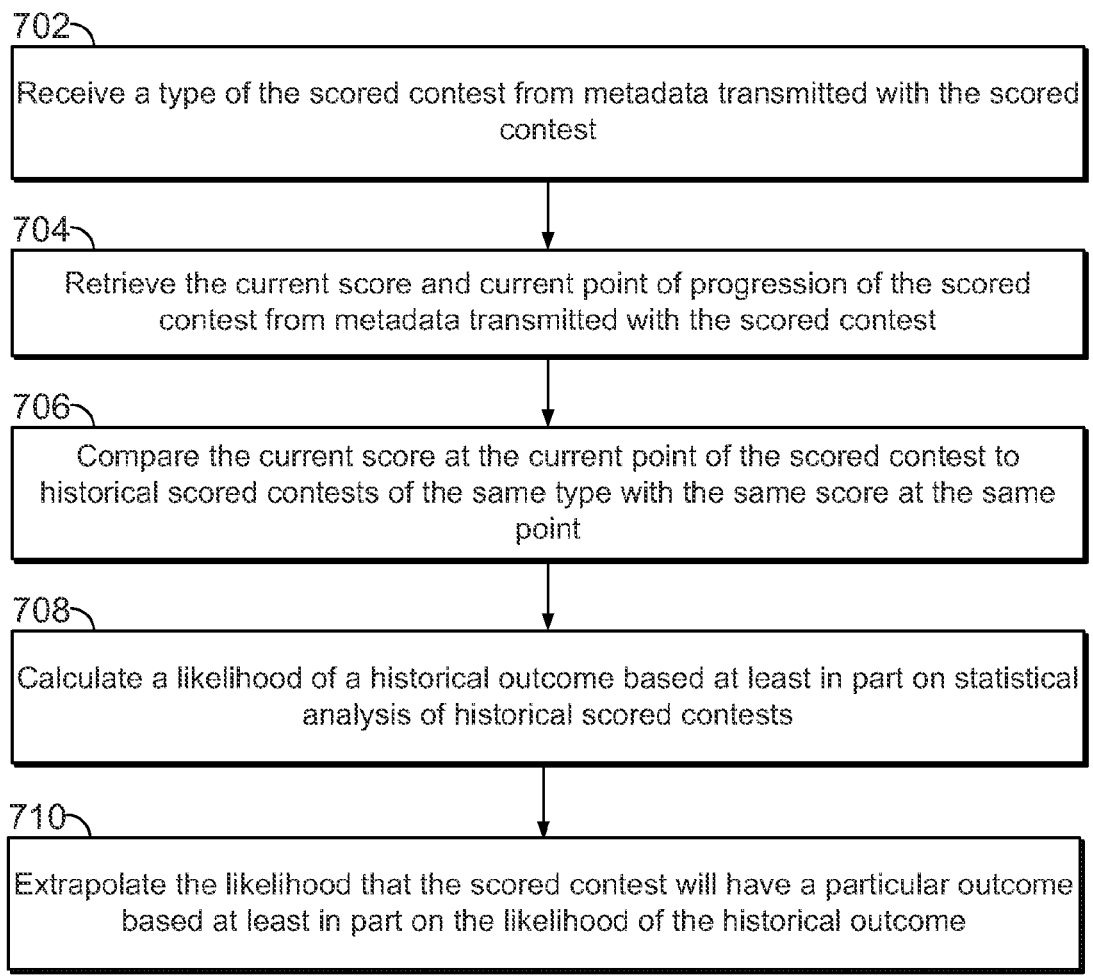
FIG. 7 is a flow-chart of illustrative steps involved in using a media guidance application to display media content listings and to estimate a likelihood of a particular outcome in accordance with some embodiments of the disclosure.

At step 606, process 600 extrapolates a first likelihood, an embodiment of which is discussed in relation to FIG. 7, that the first scored contest will have a first outcome based at least in part on a statistical analysis of the first score as the first scored contest progresses. As the first scored contest is ongoing, the first score may change. For example, in contest one of listing 502 (FIG. 5), the home team has a score of fourteen and the away team has a score of ten. In display 550, which depicts contest one about an hour later, the home team has twenty-one points. Therefore, a likelihood of an outcome (e.g., the home team winning the game) is determined in reference to particular point while the game is played. At subsequent points during the game (e.g., about an hour after the time of listing 502 (FIG. 5)), the likelihood may change. For example, the home team of contest one at the time of listing 552 has gained more points relative to the away team, resulting in a greater likelihood of the home team winning than at the time of listing 502. The calculations of the likelihood may occur at the media guidance data source 418 (FIG. 4) and may occur in real-time.

At step 608, process 600 orders the display of the listings of the first scored contest and the listing of the second scored contest on the display screen based at least in part on the first likelihood. For example, if the score indicates (e.g., one team's points are significantly greater than the other team's points) that a particular outcome (e.g., one team winning) is significantly likely, the media guidance application may display the second scored contest more prominently than the first scored contest, which may reflect the second scored contest being of more interest to the user (e.g. the user prefers more competitive scored contests). For example, in some embodiments, the listing with the lowest likelihood may be displayed more prominently (e.g., listing 502 (FIG. 5)) than the other listings (e.g., listing 504, 506, and 508 (FIG. 5).

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method.

FIG. 7 is a flow-chart of illustrative steps involved in determining a likelihood of a particular outcome in accordance with some embodiments of the disclosure. For example, in some embodiments, process 700 may occur during step 606 (FIG. 6). It should be noted that process 700 or any step thereof, could be displayed on, or provided by, any of the devices shown in FIGS. 3-4. In addition, process 700 or any step thereof, may be performed in real-time. For example, process 700 may be executed by control circuitry 304 (FIG. 3) as instructed by the media guidance application.

At step 702, process 700 receives a type of the scored contest from real-time data or metadata transmitted with the scored contest. The metadata of the listings may be received from content source 416 (FIG. 4) via the communications network 414 (FIG. 4). Real-time data, if any, may be received from real-time data source 424 (FIG. 4) via the communications network 414 (FIG. 4). In some embodiments, the media guidance application determines a type of the scored contest featured in a listing in the media guidance application. In some embodiments, as explained in further depth in relation to FIGS. 8 and 9, process 700 may process a type identifier found in data associated with the listing. The media guidance application may determine the type of the scored contest at the media guidance data source 418 (FIG. 4) or on user equipment 402, 404, and/or 406 (FIG. 4).

At step 704, process 700 retrieves the current score and current point of progression of the scored contest from real-time data or metadata transmitted with the scored contest. In some embodiments, as explained in further depth in relation to FIGS. 8 and 9, process 700 may process data associated with a listing to determine the current score and current point in the play time of the scored contest displayed in the listing. The media guidance application may determine the type of the scored contest at the media guidance data source 418 (FIG. 4) or on user equipment 402, 404, and/or 406 (FIG. 4).

At step 706, process 700 compares the current score at the current point of the scored contest to historical scored contests of the same type with the same score at the same point. In some embodiments, as explained in further depth in relation to FIGS. 10A-D, process 700 may compare data associated the current score and the current point in the play time of the scored contest with data associated with prior scored contests of the same type, with the same score at the same particular point in the prior games. The media guidance application may compare the data at the media guidance data source 418 (FIG. 4) or on user equipment 402, 404, and/or 406 (FIG. 4).

At step 708, process 700 calculates a likelihood of a historical outcome based at least in part on a statistical analysis of historical scored contests. The media guidance application may use any statistical method (e.g., adjusting for standard deviations in a normal distribution) to calculate the likelihood. In some embodiments, the media guidance application may determine the average amount of points scored in the time remaining in the scored contest by all competitors in scored contests of the same type. In some embodiments, the media guidance application may also determine the average amount of points scored by the competitor in the competitor's previous scored contests in the time remaining. In some embodiments, the media guidance application may also determine the average total amount of points scored by the competitor in the competitor's previous scored contests. Based on one or more of the averages, the media guidance application may calculate the likelihood that a historical outcome (e.g., one team scoring a particular amount of points in past scored contests). The media guidance application may extrapolate the likelihood at the media guidance data source 418 (FIG. 4) or on user equipment 402, 404, and/or 406 (FIG. 4).

At step 710, process 700 extrapolates the likelihood that the scored contest will have a particular outcome based at least in part on the likelihood of the historical outcome. In some embodiments, the likelihood calculated in step 708 may be supplement with additional data (e.g., data regarding the averages of the competitor in the scored contest as explained in the preceding paragraph, data regarding particular scoring patterns, or data regarding the current trajectory of the scoring) to determine the likelihood that the scored contest will have a particular outcome. The media guidance application may extrapolate the likelihood at the media guidance data source 418 (FIG. 4) or on user equipment 402, 404, and/or 406 (FIG. 4).

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method.

FIG. 8 is a flow-chart of illustrative steps involved in using a media guidance application to categorize and determine a type of a scored contest associated with a listing in accordance with some embodiments of the disclosure. In some embodiments, process 800 may correspond to step 702 (FIG. 7), where process 700 (FIG. 7) determines a type of the scored contest. It should be noted that process 800 or any step thereof, could be displayed on, or provided by, any of the devices shown in FIGS. 3-4. In addition, process 800 or any step thereof, may be performed in real-time. For example, process 800 may be executed by control circuitry 304 (FIG. 3) as instructed by the media guidance application.

At step 802, process 800 retrieves real-time data or metadata of a listing. In some embodiments, the real-time data or metadata of the listing may be transmitted in data describing the video asset of the listing as shown in FIG. 9 from content source 416 (FIG. 4) and/or media guidance source 418 (FIG. 4). The media guidance application may retrieve the real-time data or metadata of the listing at the media guidance data source 418 (FIG. 4) or on user equipment 402, 404, and/or 406 (FIG. 4). The metadata of the listings may be received from content source 416 (FIG. 4) via the communications network 414 (FIG. 4). Real-time data, if any, may be received from real-time data source 424 (FIG. 4) via the communications network 414 (FIG. 4).

At step 804, process 800 may determine whether or not the listing has a category (e.g., a category may be associated with one of the selectable options 202 (FIG. 2)). In some embodiments, the media guidance application may search for the presence of a category identifier. A category identifier may be any identifier that indicates the listing is of a particular category. For example, the category identifier may be transmitted in the data describing the video asset of the listing (e.g., metadata) as shown in FIG. 9 from content source 416 (FIG. 4) and/or media guidance source 418 (FIG. 4). If the listing does not have a category, process 800 proceeds to step 806. At step 806, process 800 stops. If the listing does have a category, process 800 proceeds to step 808.

At step 808, process 800 places the listing in a category based on the category identifier. In some embodiments, the value of the category identifier may be compare to values identifying a particular category in a database (e.g., a lookup table) located at content source 416 (FIG. 4) and/or media guidance source 418 (FIG. 4). In some embodiments, comparing the real-time data or metadata of the listing, which may be transmitted in data describing the video asset of the listing (e.g., metadata) as shown in FIG. 9, occurs at the media guidance data source 418 (FIG. 4) or on user equipment 402, 404, and/or 406 (FIG. 4).

At step 810, process 800 compares the category identifier to a database of category identifiers. At step 812, process 800 determines whether or not the category is a category that includes scored listings based on step 810. For example, the category may be sports programming, game show programming, award shows, reality shows, or any other type of programming featuring competitions. Each of these categories may include scored contests. In some embodiments, this information may also be retrieved from the database (e.g., a lookup table) described in step 810. In some embodiments, this step may occur at the media guidance data source 418 (FIG. 4) or on user equipment 402, 404, and/or 406 (FIG. 4). If the category is determined not to include scored listings, process 800 continues to step 814, where process 800 stops.

If the category is determined to include scored listings, process 800 continues to step 816. At step 816, process 800 retrieves a type identifier from the listing of scored contest. The type identifier may be included in the data transmitted with the listing from the content source 416 (FIG. 4) and/or media guidance source 418 (FIG. 4). For example, in some embodiments, the type identifier may be transmitted in data describing the video asset of the listing (e.g., metadata) as shown in FIG. 9. In some embodiments, this step may occur at the media guidance data source 418 (FIG. 4) or on user equipment 402, 404, and/or 406 (FIG. 4).

At step 818, process 800 compares the type identifier to a database (e.g., a lookup table of scored contests type). The database may list the type of scored contest by the type identifier(s) associated with that type. For example, process 800 may process the type identifier retrieved in step 816 in a database located at the media guidance data source 418 (FIG. 4) or on user equipment 402, 404, and/or 406 (FIG. 4). The database may determine that the type identifier retrieved in step 816 corresponds to a type identifier(s) associated with a particular type in the database.

At step 820, process 800 identifies the type of scored contest of the listing based on the comparison in step 818. Process 800 may output this value to the media guidance data source 418 (FIG. 4) or to the user equipment 402, 404, and/or 406 (FIG. 4). In some embodiments, the outputted type of the scored contest may be used to calculate the likelihood of an outcome as described in FIGS. 6 and 7.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method.

FIG. 9 shows an exemplary data structure for data transmitted with a listing in accordance with some embodiments of the disclosure. In some embodiments, data structure 900 may include the category and type identifiers as discussed in relation to FIGS. 7 and 8. In some embodiments, the media guidance data source 418 (FIG. 4) or the user equipment 402, 404, and/or 406 (FIG. 4) may receive and process data structure 900 from content source 416 (FIG. 4) and/or media guidance source 418 (FIG. 4).

Data structure 900 includes line 902. Line 902 indicates that data structure 900 is a listing. For example, line 902 may be processed by control circuitry 304 (FIG. 3) to indicate that the received data relates to a listing. For example, data structure 900 may correspond to a listing 500 (FIG. 5). The listing may correspond to a video asset displayed on user equipment 402, 404, and/or 406 (FIG. 4).

Line 904 indicates that the category of data structure 900 is "Sports." In some embodiments, line 904 may correspond to the category identifier as described in relation to FIG. 8. It should be noted that the category as described in FIG. 9 is not limiting, and in some embodiments, the category as described in FIG. 9 may be replaced or supplemented by other categories as discussed in the disclosure. For example, line 904 may be processed by control circuitry 304 (FIG. 3) to determine under what category (e.g., the categories shown in selectable options 202 (FIG. 2)) the associated listing should be placed. In some embodiments, line 904 may indicate that several listings (e.g., listings 502, 504, 506, and 508 (FIG. 5)) are of a single category (e.g., "Sports"). Therefore, the several listing may all be shown in a single display (e.g., display 500 (FIG. 5)).

Line 906 indicates the type the listing associated with data structure 900 is "Basketball." In addition, data structure 900 includes type information as indicated by lines 908, 910, 912, 914, and 916. In some embodiments, type information may be used to calculate a likelihood of an outcome as described in FIGS. 6 and 7.

Line 910 indicates that the listing associated with data structure 900 is professional basketball. Line 912 indicates that the listing associated with data structure 900 is men's basketball. Line 914 indicates that the listing associated with data structure 900 is basketball played in a national basketball league. Line 916 indicates the end of the type information. It should be noted that the type information as described in FIG. 9 is not limiting, and in some embodiments, the type information as described in FIG. 9 may be replaced or supplemented by other type information as discussed in the disclosure.

In some embodiments, lines 906, 908, 910, 912, 914, and 916 may be processed by control circuitry 304 (FIG. 3) to calculate the likelihood of an outcome. The control circuitry 304 (FIG. 3) of the media guidance application may compare the information retrieved by lines 906, 908, 910, 912, 914, and 916 to historical information featuring the same values. For example, control circuitry 304 (FIG. 3) may process lines 906, 908, 910, 912, 914, and 916 into an array (e.g., array 1002 FIG. 10A)) for use in comparing the current media content to historical information (e.g., data structure 1020 (FIG. 10B)). Lines 906, 908, 910, 912, 914, and 916 may indicate the information used to calculate the likelihood of an outcome. For example, lines 906, 908, 910, 912, 914, and 916 indicate to the media guidance system that the media content of the listing is a professional men's basketball game played in the national league. The media guidance application may then retrieve the particular scoring system, rules, historical information, or other information relating to professional men's basketball game played in the national league from media guidance source 418 (FIG. 4).

Line 918 indicates the beginning of score information in relation to the current progress of the scored contest of the listing associated with data structure 900. In some embodiments, lines 918, 920, 922, and 924 may correspond to the current score used in step 706 (FIG. 7). Line 920 indicates the "Home Team" has a current score of "98." Line 922 indicates the "Away Team" has a current score of "68." Line 924 indicates the end of the score information. It should be noted that the score information as described in FIG. 9 is not limiting, and in some embodiments, the score information as described in FIG. 9 may be replaced or supplemented by other score information as discussed in the disclosure.

In some embodiments, lines 918, 920, 922, and 924 may be processed by control circuitry 304 (FIG. 3) to calculate the likelihood of an outcome. The control circuitry 304 (FIG. 3) of the media guidance application may compare the information retrieved by lines 918, 920, 922, and 924 to historical information featuring the same values. For example, control circuitry 304 (FIG. 3) may process lines 918, 920, 922, and 924 into an array (e.g., array 1002 FIG. (10A)) for use in comparing the current media content to historical information (e.g., data structure 1020 (FIG. 10B)). The array may then be compared to historical information where the home team had a score of ninety-eight and the away team had a score of sixty-eight. This information may be combined with other information from the array (e.g., array 1002 (FIG. 10A)). For example, the media guidance application may then retrieve historical information where the home team had a score of ninety-eight and the away team had a score of sixty-eight in a professional men's basketball game played in the national league from media guidance source 418 (FIG. 4).

Line 926 indicates the beginning of progress information. In some embodiments, lines 928, 930, and 932 may correspond to the point of the scored contest as described in step 706 (FIG. 7). Line 928 indicates the run-time of the scored content. The run-time may refer to the time the scored contest has been televised, broadcasted, or streamed. Line 930 indicates the current quarter of the scored contest. Line 932 indicates the time remaining in the game time of the scored contest. Line 934 indicates the end of the progress information. It should be noted that the progress information as described in FIG. 9 is not limiting, and in some embodiments, the progress information as described in FIG. 9 may be replaced or supplemented by other progress information as discussed in the disclosure.

In some embodiments, lines 926, 928, 930, 932, and 934 may be processed by control circuitry 304 (FIG. 3) to calculate the likelihood of an outcome. The control circuitry 304 (FIG. 3) of the media guidance application may compare the information retrieved by lines 926, 928, 930, 932, and 934 to historical information featuring the same values. For example, control circuitry 304 (FIG. 3) may process lines 926, 928, 930, 932, and 934 into an array (e.g., array 1002 (FIG. 10A)) for use in comparing the current media content to historical information (e.g., data structure 1020 (FIG. 10B)). The array may then be compared to historical information where the point of the scored contest was the same (e.g., the runtime of the game was one-hour, forty minutes and twenty-four seconds, the game was in the fourth quarter, and/or the time remaining in the game was ten minutes and forty-six seconds. This information may be combined with other information from the array (e.g., array 1002 (FIG. 10A)). For example, the media guidance application may retrieve historical information where the home team had a score of ninety-eight and the away team had a score of sixty-eight at the same point in a professional men's basketball game played in the national league from media guidance source 418 (FIG. 4).

Line 936 indicates end of the data transmitted with the listing. It should be noted that the listing information as described in FIG. 9 is not limiting, and in some embodiments, the listing information as described in FIG. 9 may be replaced or supplemented by other listing information as discussed in the disclosure. For example, line 936 may be processed by control circuitry 304 (FIG. 3) to indicate that the all data relating to the listing was transmitted.

Figure 10A:
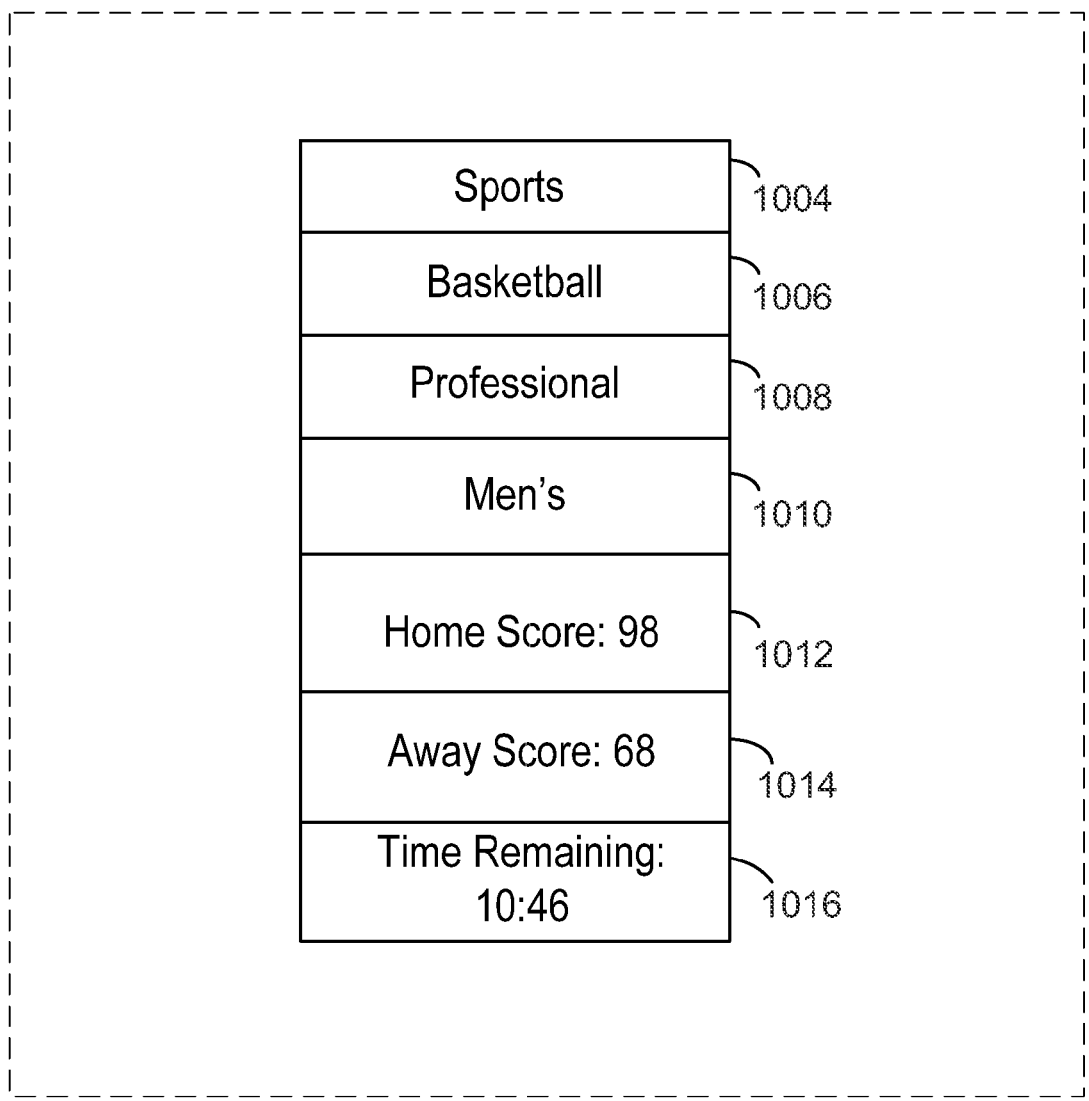
FIG. 10A shows an exemplary data structure for data associated with a listing in accordance with some embodiments of the disclosure.

FIG. 10A shows an exemplary data structure for data associated a listing in accordance with some embodiments of the disclosure. For example, array 1002 may represent data used by the media guidance application to calculate a likelihood of an outcome as described in step 606 (FIG. 6). In some embodiments, the media guidance application will organize information received in the real-time data or metadata of a listing (e.g., date structure 900 (FIG. 9)) into an array of data fields (e.g., array 1002). The array of data fields (e.g., array 1002) may then be processed according to process 1100 (FIG. 11) to output the likelihood of an outcome. Array 1002 may be located on the media guidance data source 418 (FIG. 4) or the user equipment 402, 404, and/or 406 (FIG. 4).

Array 1002 includes several fields. Field 1004 indicates the category (e.g., the category described in line 904 (FIG. 9)) of the listing. For example, the value in field 1004 may be used to determine whether or not the listing belongs in one or more of selectable options 202 (FIG. 2). Field 1006 indicates that the type (e.g., the type described in line 906 (FIG. 9)) of the listing. For example, the value of field 1006 may be used to determine the type of a listing as described by process 800 (FIG. 8). For example, field 1004 may be generated by control circuitry 304 (FIG. 3) to determine the category (e.g., the categories shown as selectable options 202 (FIG. 2)) of the associated listing. In some embodiments, field 1004 may indicate that several listings (e.g., listings 502, 504, 506, and 508 (FIG. 5)) are of a single category (e.g., "Sports") and may be shown in a single display (e.g., display 500 (FIG. 5)).

Figure 11:
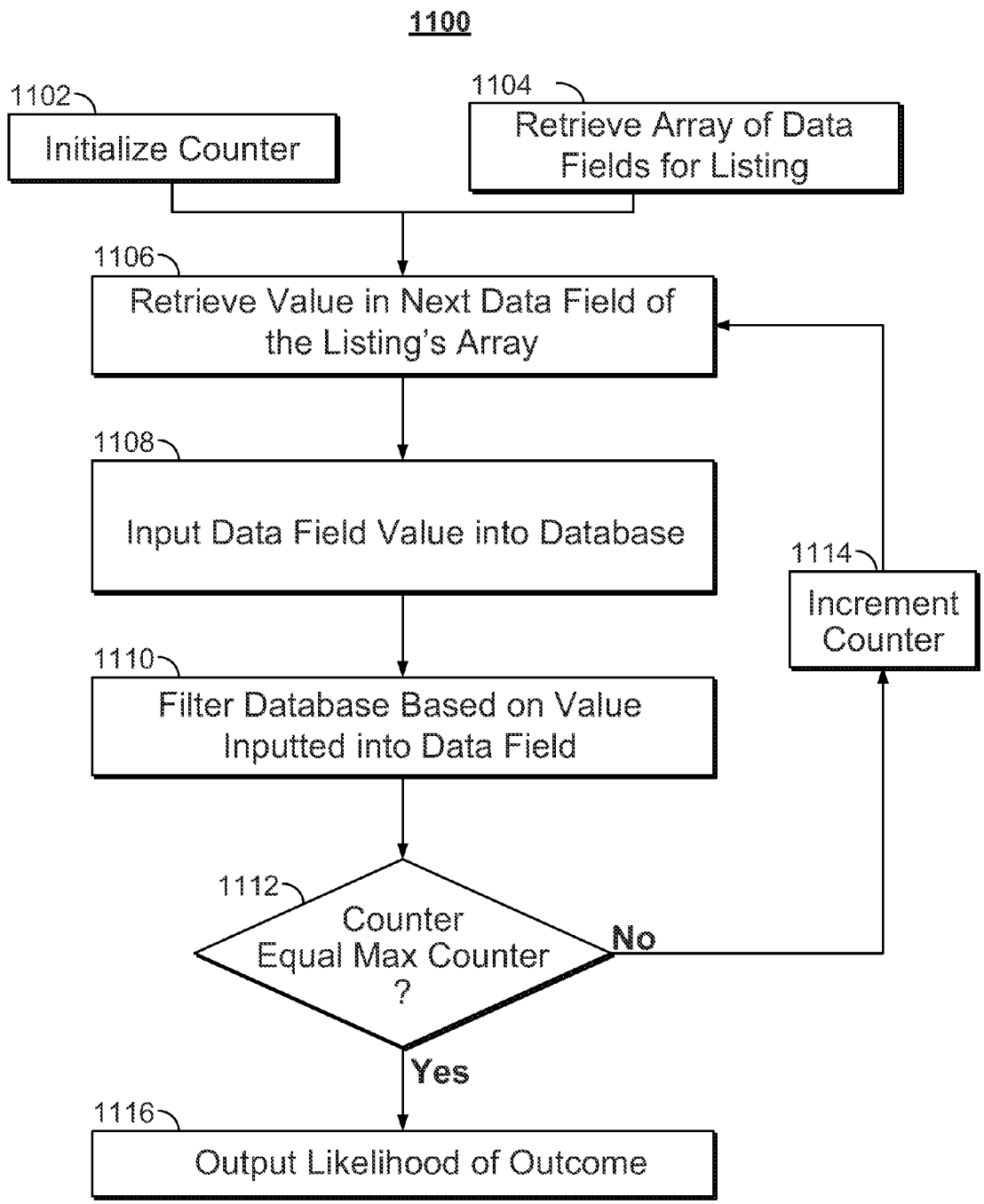
FIG. 11 is a flow-chart of illustrative steps involved in using a media guidance application to display media content listings and to output a likelihood of an outcome in accordance with some embodiments of the disclosure.

Field 1008 and field 1010 of array 1002 indicate type information for a listing. For example, field 1008 and field 1010 may correspond to the real-time data or metadata of a listing such as line 910 and line 912 (FIG. 9). In some embodiments, array 1002 may include only some of the information received in the real-time data or metadata of the listing (e.g., data structure 900 (FIG. 9)). For example, in some embodiments, array 1002 may not include all type information that was transmitted with the listing (e.g., line 914 (FIG. 9)). In some embodiments, the media guidance application may determine whether or not a particular type information (e.g., line 914 (FIG. 9)) is needed in determining a likelihood of an outcome (e.g., processing the array 1002 in process 1100 (FIG. 11).

In some embodiments, field 1008 and field 1010 may be used by control circuitry 304 (FIG. 3) to calculate the likelihood of an outcome. The control circuitry 304 (FIG. 3) of the media guidance application may use the information processed in field 1008 and field 1010 to determine the type of listing of historical information that should be used. For example, control circuitry 304 (FIG. 3) may use field 1008 and field 1010 of array 1002 to determine that the current media content should be compared to historical information (e.g., data structure 1020 (FIG. 10B)) of professional men's basketball games played in the national league as described process 1100 (FIG. 11). Field 1008 and field 1010 may further indicate the particular scoring system, rules, or other information used to calculate the likelihood of an outcome.

Field 1012 indicates a particular score related to a competitor in the scored contest. For example, in some embodiments, field 1012 may relate to line 920 of data structure 900 (FIG. 9)). Field 1014 also indicates a particular score related to a competitor in the scored contest. For example, in some embodiments, field 1014 may relate to line 922 of data structure 900 (FIG. 9)). In some embodiments, the values retrieved in field 1012 and field 1014 may be inputted into process 1100 (FIG. 11) to output a likelihood of an outcome.

In some embodiments, field 1012 and field 1014 may be used by control circuitry 304 (FIG. 3) to calculate the likelihood of an outcome. The control circuitry 304 (FIG. 3) of the media guidance application may compare the information in field 1012 and field 1014 to historical information featuring the same values. For example, control circuitry 304 (FIG. 3) may process field 1012 and field 1014 of array 1002 to compare the current media content to historical information (e.g., data structure 1020 (FIG. 10B)) as described process 1100 (FIG. 11). Field 1012 and 1014 may indicate that the array should be compared to historical information where the home team had a score of ninety-eight and the away team had a score of sixty-eight.

Field 1016 indicates the time remaining in the scored contest. For example, in some embodiments, field 1016 may relate to line 932 of data structure 900 (FIG. 9)). The media guidance application may retrieve the time remaining (e.g., the value in field 1016) of the game time of the scored contest. In some embodiments, the media guidance application may select one or more line of progress information retrieved from data transmitted with a listing (e.g., lines 926, 928, 930, 932, and 934 (FIG. 9)) to use in array 1002. For example, the media guidance application may determine only some of the progress information transmitted with the listing is required to output a likelihood of an outcome (e.g., step 1116 (FIG. 11)).

In some embodiments, field 1016 may be used by control circuitry 304 (FIG. 3) to calculate the likelihood of an outcome. The control circuitry 304 (FIG. 3) of the media guidance application may compare the information in field 1016 to historical information featuring the same value. For example, control circuitry 304 (FIG. 3) may process field 1016 of array 1002 to compare the current media content to historical information (e.g., data structure 1020 (FIG. 10B)) as described process 1100 (FIG. 11). Field 1016 indicates to the media guidance application that the current game should be compared to historical information where the time remaining in the game was ten minutes and forty-six seconds.

FIG. 10B shows an exemplary data structure for historical data related to the data associated with media content in accordance with some embodiments of the disclosure. Data structure 1020 includes several data field lines, each line having multiple data fields. For example, data structure 1020 may represent a database including data fields of historical information. Data structure 1020 may be located on the media guidance data source 418 (FIG. 4) or the user equipment 402, 404, and/or 406 (FIG. 4).

Data structure 1020 contains various types of historical information on prior scored contests. In some embodiments, the media guidance application may determine the relevant data for calculating a likelihood of an outcome (e.g., as described in step 606 (FIG. 6)). For example, data field lines 1022, 1024, 1026, and 1028 relate to historical information that differs from the information as received from the data transmitted with a listing (e.g., array 1002 (FIG. 10A)) for a current scored contest.

Data fields line 1022 refers to professional basketball where the score was ninety-eight to sixty-eight; however, the current time remaining was seven minutes and forty-six seconds, instead of ten minutes and forty-six seconds. Data fields line 1024 refers to basketball where the score was ninety-eight to sixty-eight with ten minutes and forty-six seconds remaining; however, the game was non-professional instead of professional. Data fields line 1026 refers to a game where the score was ninety-eight to sixty-eight with ten minutes and forty-six seconds; however, the game was football instead of basketball as well as being non-professional instead of being professional. Data fields line 1029 refers to professional basketball where the score was seventy-four to sixty-eight with ten minutes and forty-six seconds. In each of these cases, data field lines 1022, 1024, 1026, and 1028 may be excluded for use in determining a likelihood because one or more of the data fields in the data fields line did not correspond to the information transmitted with the listing (e.g., array 1002 (FIG. 10A)) for a current scored contest.

FIG. 10C shows an exemplary data structure for the likelihood of an outcome related to the data associated with media content in accordance with some embodiments of the disclosure. Data structure 1030 includes several data field lines, each line having multiple data fields. For example, data structure 1030 may represent a database including data fields of historical information. Data structure 1030 may be located on the media guidance data source 418 (FIG. 4) or the user equipment 402, 404, and/or 406 (FIG. 4).

In some embodiments, data structure 1030 may represent historical information in a database after it has been filtered for information that does not correspond to information transmitted with a listing (e.g., array 1002 (FIG. 10A)). For example, data structure 1030 may represent information that corresponds to information transmitted with a listing (e.g., array 1002 (FIG. 10A)) after information that does not correspond (e.g., data field lines 1022, 1024, 1026, and 1028 (FIG. 10B)) has been filtered out.

In some embodiments, data structure 1030 may represent the database, which includes only information corresponding to data transmitted with a listing (e.g., array 1002 (FIG. 10A)) for a current scored contest. For example, in some embodiments, a separate database may correspond to every possible score at each moment during the progression of content associated with a listing. In some embodiments, one or more databases may correspond to particular scores (e.g., when one contestant's score reaches a certain amount) or particular points in the progression of the content associated with the listing (e.g., the end of each quarter of game time of a basketball game).

Figure 10D:
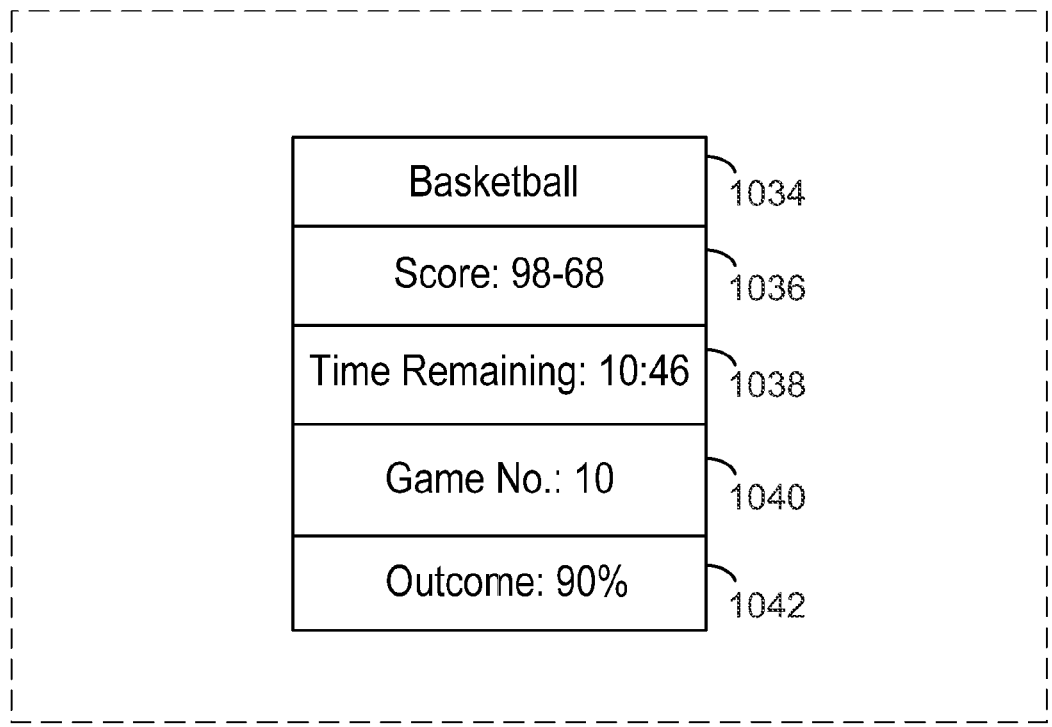
FIG. 10D shows an exemplary data structure for historical data related to the data associated with a listing in accordance with some embodiments of the disclosure.

FIG. 10D shows an exemplary array after processing by the media guidance application. For example, array 1032 may represent an array produced after comparing the information transmitted with a listing (e.g., array 1002 (FIG. 10A)) regarding the current score and point of progress of a current scored contest with corresponding, historical scored contests (e.g., the number of corresponding, historical scored contests in data structure 1030 (FIG. 10C)). Array 1032 may be located on the media guidance data source 418 (FIG. 4) or the user equipment 402, 404, and/or 406 (FIG. 4).

Array 1032 includes several data field lines. Data field 1034 may indicate that the scored contest is basketball. Data field 1036 may indicate that the score of the scored contest is ninety-eight to sixty-eight. Data field 1038 may indicate that the time remaining in the scored contest is ten minutes and forty-six seconds. Data field 1040 may indicate that the number of corresponding historical scored contests (e.g., the number of corresponding, historical scored contests in data structure 1030 (FIG. 10C)) was ten. Data field 1042 may indicate that, based on the corresponding historical scored contests (e.g., the corresponding, historical scored contests in data structure 1030 (FIG. 10C)), an outcome (e.g., the home team with winning the current contest) has a ninety percent likelihood.

For example, the media guidance application may determine the likelihood of a particular outcome for a current scored contest based on outcomes of historical contests as listed in data structure 1030 (FIG. 10C). For example, of the ten historical contests shown in FIG. 10C of the same type and with the same score at a particular point in the progression of the game of array 1002 (FIG. 10A), only data fields line 1031 has the away team winning the contest. Therefore, the media guidance application may determine a particular outcome (e.g., the home team with winning the current contest) for the current scored listing has a ninety percent likelihood. Alternatively, the media guidance application may determine another outcome (e.g., the away team winning the current contest) has a ten percent likelihood.

In some embodiments, data field 1042 may be generated by control circuitry 304 (FIG. 3). Data field 1042 may be used to determine the order of the associated listing (e.g., listing 502 (FIG. 5)) in the display of the media guidance application (e.g., display 500 (FIG. 5)). Corresponding data fields may be generated for media content of other listings (e.g., listings 504, 506, and 508 (FIG. 5)) and used to determine the position of those listings in the display (e.g., display 500 (FIG. 5)) of the media guidance application.

FIG. 11 is a flowchart of illustrative steps involved in calculating a likelihood of an outcome in a scored contest in accordance with some embodiments of the disclosure. In some embodiments, FIG. 11 may be a more detailed description of the process of step 606 (FIG. 6). For example, process 1100 may describe the method used to calculate the likelihood of an outcome (e.g., one contestant winning) a scored contest. In some embodiments, the scored contest may be professional basketball game, and the media guidance application may determine the likelihood that one team wins the game. It should be noted that process 1100 or any step thereof, could be displayed on, or provided by, any of the devices shown in FIGS. 3-4. In addition, process 1100 or any step thereof, may be performed in real-time. For example, process 1100 may be executed by control circuitry 304 (FIG. 3) as instructed by the media guidance application.

FIG. 11 shows process 1100. At step 1102, process 1100 initializes a counter. For example, process 1100 may initialize the counter by making the value of the counter zero. At step 1104, process 1100 retrieves an array of data fields for a current listing. For example, the array of data fields for a current listing may correspond to array 1002 (FIG. 10A).

At step 1106, process 1100 retrieves the value in the next data field of the current listing's array. In some embodiments, the current listing's array may have several data fields corresponding to the type of the scored contest, the current score of the scored contest, and the progress of the scored contest. Process 1100 may initially determine the type of the scored contest. For example, the first data field analyzed may identify the particular type of scored contest is "basketball" (e.g., using data field 1006 (FIG. 10A)).

At step 1108, process 1100 inputs the data field value retrieved in step 1106 into a database. The database may be located locally at user equipment 402, 404, and/or 406 (FIG. 4) or may be located at media guidance data source 418 (FIG. 4) and accessed via the communications network 414 (FIG. 4). The database may contain historical information on prior scored contests (e.g., data structure 1020 (FIG. 10B)) as well as the outcome of those prior scored contests.

At step 1110, process 1100 filters the database based on the value inputted into the data field. In some embodiments, the database may be structured as a lookup table, which is filtered according to the values that are inputted into the table. For example, the lookup table may contain a wide range of information on various types, scores, and outcomes (e.g., data structure 1020 FIG. 10B)). As information is inputted into the database, the information presented may be filtered to show only information (e.g., data structure 1030 (FIG. 10C)), which corresponds to the data transmitted with the current listing (e.g., array 1002 (FIG. 10A)).

At step 1112, process 1100 determines whether or not the counter value equals a maximum counter value. If the value does not equal the maximum counter value, process 1100 will add one increment to the counter at step 1114 and return to step 1106. For example, if the first iteration analyzed the first data field in the array of data fields (e.g., data field 1006 of array 1002 (FIG. 10A), then the next data field analyzed may be the next data field in the array of data fields (e.g., data field 1008 of array 1002 (FIG. 10A)). In some embodiments, subsequent iterations of process 1100 may determine the current score of the scored contest (e.g., using data field 1012 and data field 1014 (FIG. 10A)) and the progress of the scored contest (e.g., using data field 1016 (FIG. 10A)).

If the counter value equals the maximum counter value at step 1112, process 1100 may output a likelihood of a particular outcome (e.g., data field 1042 of array 1032 (FIG. 10D)) at step 1116. In some embodiments, outputting a likelihood of an outcome may include retrieving the percentage of outcomes of historical scored contests which correspond to the current score and progress of the current scored listing (e.g., data field 1042 of array 1032 (FIG. 10D)).

It should be noted that any of the devices or equipment discussed in relation to FIGS. 3-4 could be used to perform one of more of the steps in FIG. 11. It is also contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method.

Figure 12A:
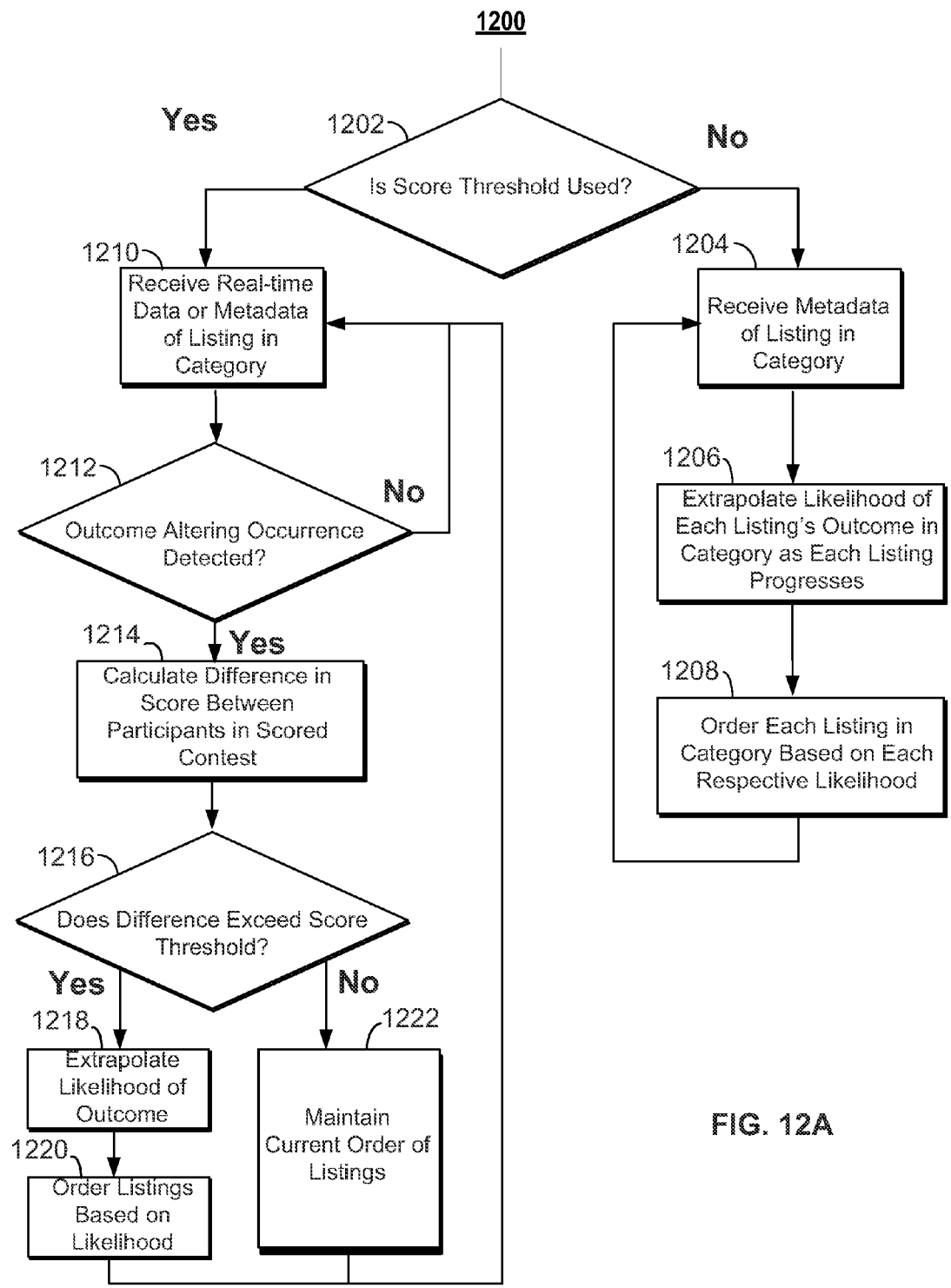
FIG. 12A is a flow-chart of illustrative steps involved in using a media guidance application to display media content listings and to order the display of listings in accordance with some embodiments of the disclosure.

FIG. 12A is a flow-chart of illustrative steps describing the re-ordering of the listings in the media guidance application. It should be noted that process 1200 or any step thereof, could be displayed on, or provided by, any of the devices shown in FIGS. 3-4. In addition, process 1200 or any step thereof, may be performed in real-time. For example, process 1200 may be executed by control circuitry 304 (FIG. 3) as instructed by the media guidance application.

At step 1202, process 1200 determines whether or not a score threshold is used. In some embodiments, score thresholds are used to extrapolate a likelihood of an outcome in a scored contest. In some embodiments, the media guidance application may periodically or continually (e.g., in real-time) determine the likelihood of each outcome of a listing. This may also include simultaneously extrapolating the likelihood of each outcome or each listing in a category displayed by the media guidance application. In some embodiments, the media guidance application may extrapolate the likelihood of each outcome upon a change that may affect the outcome (e.g., the scoring of points by one competitor, the change in the amount of time remaining, and/or the occurrence of a particular event).

If a score threshold is not used, process 1200 proceeds to step 1204. At step 1204, process 1200 receives real-time data or metadata of each listing in a category. For example, the media guidance application may receive real-time data or metadata of each listing describing the listing and information about the progress of the content associated with the listing (e.g., data structure 900 FIG. 9)).

At step 1206, process 1200 extrapolates the likelihood of each listing's outcome in the category as content associated with each listing progresses. In some embodiments, the real-time data or metadata of each listing in a category (e.g., data structure 900) FIG. 9)) may be processed according to process 700 (FIG. 7). For example, the media guidance application may determine the likelihood of an outcome for every listing in the category.

At step 1208, process 1200 orders each listing in the category based on each respective likelihood. For example, the media guidance application may then arrange the listings in an order on the display (e.g., display 500 (FIG. 5)). In some embodiments, the listing with the lowest likelihood may be displayed more prominently (e.g., listing 502 (FIG. 5)) than the other listings (e.g., listing 504, 506, and 508 (FIG. 5). For example, if the listing is a scored contest, the listing with the lowest likelihood may represent the listing that is the most competitive. Therefore, a user may be more interested in this listing than other listings. Moreover, a listing with a very high likelihood of an outcome may represent a scored contest that is uncompetitive. Therefore, a user may have little interest in watching the game, and the listing is display less prominently on the display. After step 1208, process 1200 returns to step 1204.

If a score threshold is used, process 1200 proceeds to step 1210. At step 1210, process 1200 receives real-time data or metadata of each listing in a category. For example, the media guidance application may receive real-time data or metadata of each listing describing the listing and information about the progress of the content associated with the listing (e.g., data structure (900 FIG. 9)). In some embodiments, data such as the type of the media content of the listing (e.g., line 906 (FIG. 9)) may indicate to the media guidance application the scoring system, rules, historical information, or other factors used to generate a score threshold.

At step 1212, process 1200 determines whether or not there was an outcome altering occurrence (e.g., the scoring of points by one competitor, the change in the amount of time remaining, and/or the occurrence of a particular event). If there was not an outcome altering occurrence detected, process 1200 returns to step 1210. If there was an outcome altering occurrence detected, process 1200 proceeds to step 1214. In some embodiments, the media guidance application may determine the presence of an outcome altering occurrence by detecting changes in information about the progress of the content associated with the listing from real-time data or metadata (e.g., data structure 900 (FIG. 9)) received in step 1210.

At step 1214, process 1200 calculates the difference in score between participants in the score contest. For example, the media guidance application may retrieve information (e.g., lines 920 and 922 (FIG. 9)) from the data transmitted with the listing. Based on the information, the media guidance application may determine a difference between the participants in the score contest.

At step 1216, process 1200 determines whether or not the difference exceeds a score threshold. The score threshold may be a value retrieved from or located on the media guidance data source 418 (FIG. 4) or the user equipment 402, 404, and/or 406 (FIG. 4). For example, in some embodiments, the value may be retrieved from data structure 1250 (FIG. 12B). If the difference exceeds the score threshold, process 1200 extrapolates a likelihood for an outcome associated with each listing. Based on the outcome, process 1200 orders the listing at step 1220. In some embodiments, the media guidance application may determine the value of the score threshold based on data received in step 1210. For example, if the data received in step 1210 indicated that the scored contest was the sport of hockey, the difference in the scores of the competitors needed to exceed the score threshold would likely be smaller than if the scored contest was the sport of football as the scoring systems and rules of football allow for more points to be scored during a typical game than in a typical game of hockey. In addition, the time remaining in the contest may be used to determine the score threshold as shown in data structure 1250 (FIG. 12B)).

If the difference does not exceed the score threshold, process 1200 maintains the current order of the listing at step 1222. Following either step 1220 or step 1222, process 1200 proceeds to step 1210 and retrieves current data associated with the listing in each category.

It is contemplated that the steps or descriptions of FIG. 12A may be used with any other embodiment of this disclosure. In addition, the steps and descriptions described in relation to FIG. 12A may be done in alternative orders or in parallel to further the purposes of this disclosure. For example, each of these steps may be performed in any order or in parallel or substantially simultaneously to reduce lag or increase the speed of the system or method.

FIG. 12B is an exemplary data structure used to compute a score threshold in a scored contest featuring various sports. Data structure 1250 may be retrieved from or located on the media guidance data source 418 (FIG. 4) or the user equipment 402, 404, and/or 406 (FIG. 4). For each sport in column 1254, data structure 1250 lists a score threshold in data fields 1256 with varying percentages of the scored contest remaining as shown in row 1252. The score threshold in data fields 1256 is represented as the score differential between two competitors in the contest. Data structure 1250 may indicate that a particular outcome (e.g., one team winning) has a particular likelihood (e.g., ninety percent). The particular likelihood may be adjusted or set by the media guidance application and/or the user.

For example, based on the time remaining as shown in row 1252, the corresponding score threshold for each sport as shown in data fields 1256 may decrease. The decrease in the score threshold may corresponds with the likelihood of a particular outcome. For example, as the time remaining in a game decreases, the time available for one competitor in the game to increase their point total also decreases. Consequently, the score threshold decreases. In addition, the amount of the score threshold for each sport with the same amount of time remaining is also different. The difference corresponds to the different scoring systems of each sport. For example, scoring seven points (e.g., via a touchdown) in football is easier than scoring seven points (e.g., via seven goals) in hockey.

In some embodiments, the percentage of the scored contest remaining may refer to the time on a game clock remaining (e.g., if the sport is football), the number of innings remaining (e.g., if the sport is baseball), the number laps remaining (e.g., if the sport is running, swimming, or car/horse racing), the number holes (e.g., if the sport is golf), the number sets (e.g., if the sport is tennis), or any other demarcation of the amount of time left in a contest. In some embodiments, data structure 1250 may not be limited to sports. For example, information for game shows or other scored contest may be compiled in a corresponding data structure. In addition, in some embodiments, non-scored contest may also be adapted into data structure 1250 by quantifying metrics related to user interest (e.g., ratings).

For example, when computing a score threshold for a scored contest featuring the sport of golf, the media guidance application may refer to data structure 1250. In this example, the percentage of the scored contest remaining may refer to a particular number of holes (e.g., twenty-five percent of the scored contest remaining may mean nine holes of a thirty-six hole contest remains). Using data structure 1250, the media guidance application may determine that the score threshold is equal to a point differential of four (e.g., the equivalent of four strokes). If the differential between two competitors (e.g., in a two man competition) or between the current first and second place competitor (e.g., in a competition with more than two competitors) exceeds four strokes, the score threshold may be exceeded. Consequently, the order of the listing (e.g., listing 502 (FIG. 5)) associated with the golf game among the other listings (e.g., listings 504, 506, and 508 (FIG. 5)) on the display (e.g., display 500 (FIG. 5)) may change.

Figure 13:
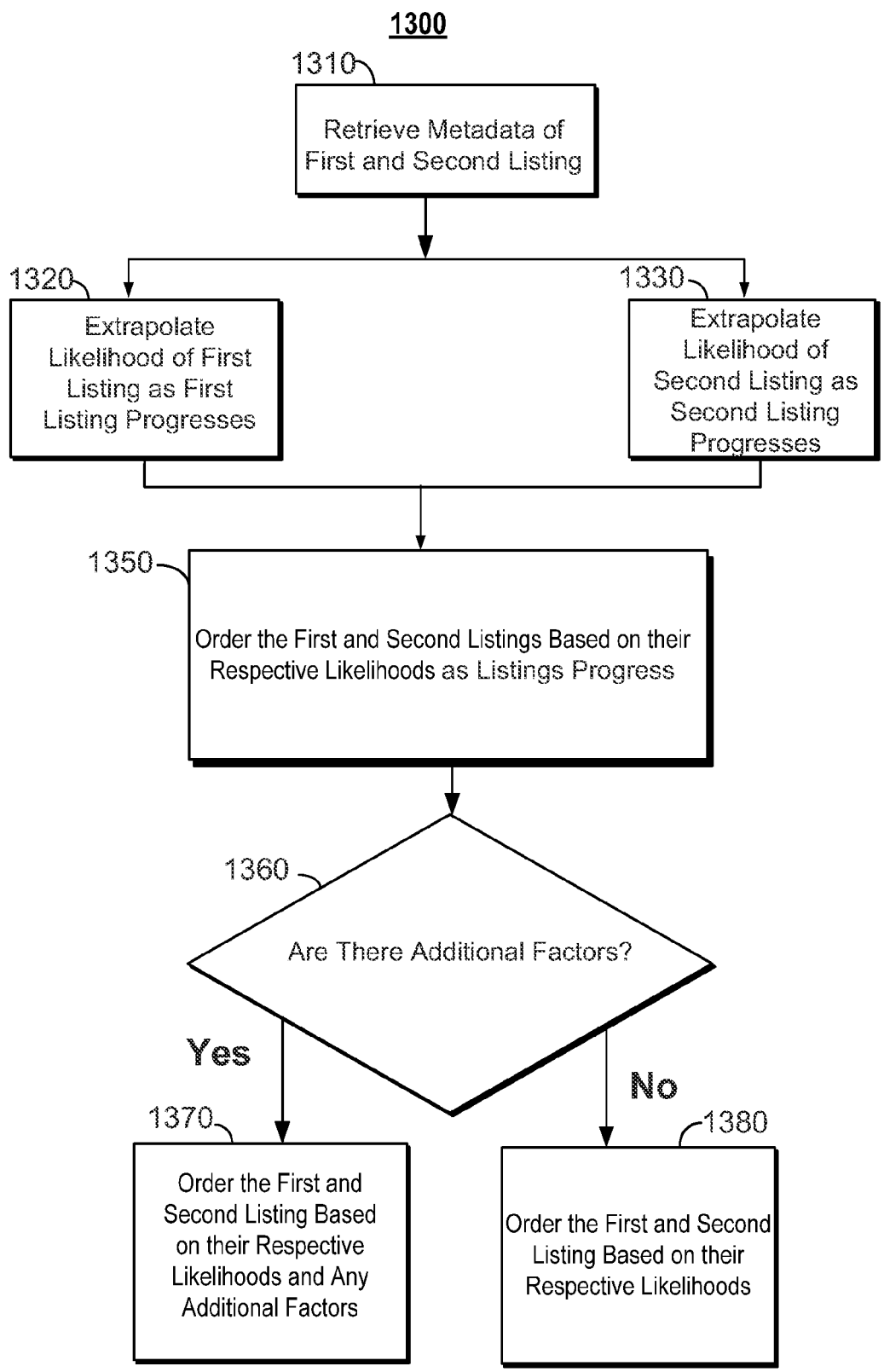
FIG. 13 is a flow-chart of illustrative steps involved in using a media guidance application to display media content listings and to order the display of listings in accordance with some embodiments of the disclosure.

FIG. 13 is a flow-chart of illustrative steps involved in using a media guidance application to display media content options and order the display of listings in accordance with some embodiments of the disclosure. It should be noted that process 1300 or any step thereof, could be displayed on, or provided by, any of the devices shown in FIGS. 3-4. In addition, process 1300 or any step thereof, may be performed in real-time. For example, process 1300 may be executed by control circuitry 304 (FIG. 3) as instructed by the media guidance application.

FIG. 13 describes process 1300. At step 1310, process 1300 retrieves real-time data or metadata of the first listing and the second listing. The data may be retrieved from the media guidance data source 418 (FIG. 4) or the user equipment 402, 404, and/or 406 (FIG. 4). In some embodiments, data may also be retrieved from any device accessible via the communication network 414 (FIG. 4). For example, additional data regarding the listing may be transmitted from a third party source. The data transmitted with the listing may arrive in a separate file, or may be included with the transmitted listing (e.g., the data may be transmitted in the real-time data or metadata of the listing). In some embodiments, the media guidance application retrieves and interprets the real-time data or metadata of the listing. For example, process 1300 may analyze a data structure transmitted with each listing (e.g., data structure 900 (FIG. 9)) to produce a data structure that may be processed by the media guidance application (e.g. array 1002 (FIG. 10A).

At step 1320, process 1300 extrapolates a likelihood of an outcome of the first listing as the content associated with the first listing progresses. At step 1330, process 1300 extrapolates a likelihood of an outcome of the second listing as the content associated with the second listing progresses. In some embodiments, process 1300 may use some, all, or a variation of process 600 (FIG. 6) and process 700 (FIG. 7) to extrapolate the likelihood of an outcome relating to the listing. For example, if the listing relates to a scored contest, process 1300 may compare the data received in step 1310 to historical data corresponding to the scored contest (e.g., data structure 1030 (FIG. 10C)). Extrapolating a likelihood in steps 1320 and 1330, may occur on the media guidance data source 418 (FIG. 4) or the user equipment 402, 404, and/or 406 (FIG. 4). In some embodiments, calculating a likelihood of an outcome relating to the listing may also occur on a device accessible via the communication network 414 (FIG. 4).

At step 1350, process 1300 may order the first and second listings based on their respective likelihoods as the content associated with the listings progresses. For example, the listings may be ordered as discussed in relation to FIG. 12A. At step 1360, process 1300 determines whether or not there are additional factors. For example, one participant may be rapidly scoring points and quickly overcoming a point deficit in relation to the other participants. The user may enjoy watching one participant's comeback in a scored contest. Therefore, the user may be more interested in watching this particular listing. In another example, the winning team may have initially been a lower ranked opponent; therefore, the victory over the higher ranked opponent may represent an upset. The user may enjoy "upset" victories, and therefore be more interested in viewing this listing.

If there are not additional factors, process 1300 proceeds to step 1380 and the first and second listing are ordered based on their respective likelihoods. If there are additional factors, process 1300 proceeds to step 1370 and orders the first and second listing based on their respective likelihoods and any additional factors. In some embodiments, the ordered listing of step 1370 and/or step 1380 may be displayed on user equipment 402, 404, and/or 406 (FIG. 4).

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method.

FIG. 14 is an illustrative graph used to describe some embodiments of additional factors in accordance with some embodiments of the disclosure. Graph 1400 and graph 1450 track the score of two teams during the progress of a scored contest as represented by the designated lines. In some embodiments, the media guidance application may track the scores of each team in the scored contest as an additional factor. At the time equals fifteen, the difference in the score between the two teams of graph 1400 and graph 1450 is the same. However, the scored contest described by graph 1450 has been more competitive (e.g., the difference between the scores of the two teams has consistently been smaller) throughout the progression of the game. In contrast, graph 1450 describes a scored contest that has been less competitive (e.g., the difference between the scores of the two teams has consistently been larger) throughout the progression of the game.

In some embodiments, the scored contest described in graph 1450 may be more prominently displayed (e.g., as represented by listing 502 (FIG. 5)) than the scored contest described in graph 1400. Moreover, at time equals fifteen the two teams have equal scores relative to each other. In some embodiments, this may mean that the media guidance application would not give preference to one listing over the other. Furthermore, as the scored contest of graph 1450 was displayed more prominently initially, the scored contest of graph 1450 may remain displayed more prominently. However, in some embodiments, the rapid increase in points of the away team in graph 1400 relative to the home team may indicate to the media guidance application that the away team may be making a comeback. If the user enjoys watching comeback (e.g., as indicated by a user profile), the media guidance application may give preference to the scored contest described by graph 1400 over the scored contest described by graph 1450.

FIG. 15 is an illustrative graph used to describe some embodiments of additional factors in accordance with some embodiments of the disclosure. Graph 1500 and graph 1550 track the score of two teams during the progress of a scored contest as represented by the designated lines. As shown in graph 1500 and graph 1550, the difference between the score of the two teams in each graph is the same. However, the progress of each scored contest is different. The scored contest in graph 1500 is at time equals ten, whereas the scored contest in graph 1550 is at time equals fifteen. The progress of each scored contest may affect the display of the listing associated with the scored contest.

For example, as determined by a user profile, a user may prefer watching the end of scored contests. Therefore, the display of the listings may be affected by not only the likelihood of a particular outcome in the scored contest, but also the progress of the scored contest. In another example, the time between ten and fifteen may represent overtime in a game. The user profile may indicate that the user enjoys overtime; therefore graph 1550 may be more prominently displayed.

Figure 16:
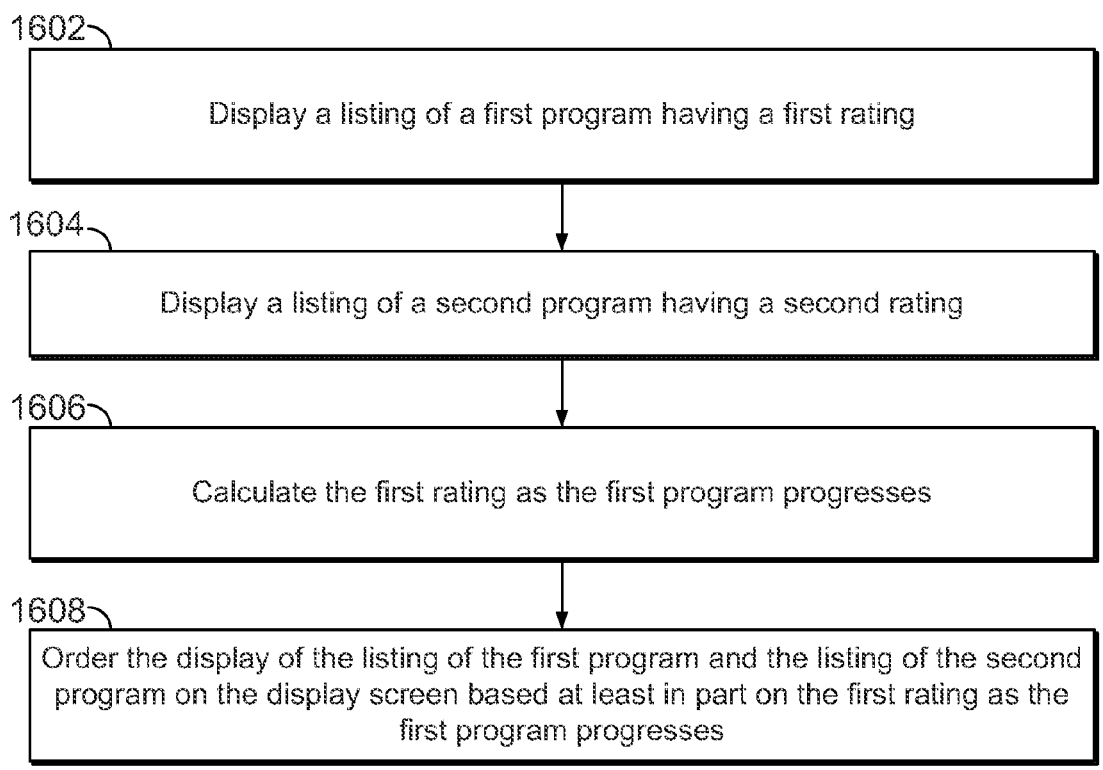
FIG. 16 is a flow-chart of illustrative steps involved in using a media guidance application to display media content listings in accordance with some embodiments of the disclosure.

FIG. 16 is a flow-chart of illustrative steps involved in using a media guidance application to order the display of media content listings in accordance with some embodiments of the disclosure. It should be noted that process 1600 or any step thereof, could be displayed on, or provided by, any of the devices shown in FIGS. 3-4. In addition, process 1600 or any step thereof, may be performed in real-time. For example, process 1600 may be executed by control circuitry 304 (FIG. 3) as instructed by the media guidance application.

At step 1602, process 1600 displays a listing of a first non-scored contest (e.g., a movie) having a first rating. At step 1604, process 1600 displays a listing for a second non-scored contest (e.g., another movie, or alternatively, a news program) having a second rating. The display of listings in steps 1602 and 1604 of process 1600 may occur on user equipment 402, 404, and/or 406 (FIG. 4). The video assets, if any, associated with the listings may be received from content source 416 (FIG. 4) via the communications network 414 (FIG. 4). The media guidance application may be located locally at user equipment 402, 404, and/or 406 (FIG. 4) or may be located at media guidance data source 418 (FIG. 4) and accessed via the communications network 414 (FIG. 4).

At step 1606, process 1600 calculates a first rating, which will be discussed in depth in relation to FIG. 17, that the first non-scored contest as the first non-scored contest progresses. For example, as the first non-scored contest is on-going, the first rating may increase (e.g., due to a particular plot-twist or the appearance of a particular character). At subsequent points during the first non-scored contest, the rating may decrease (e.g., due to lack of viewer interest). The calculation of the rating may happen periodically or continually as discussed in relation to FIG. 17. The calculations of the ratings may occur at the media guidance data source 418 (FIG. 4).

At step 1608, process 1600 orders the display of the listings of the first non-scored contest and the listing of the second non-scored contest on the display screen based at least in part on the first rating. For example, if the ratings indicate that a particular non-scored contest is very popular or unpopular, the media guidance application may adjust position of the listing in the display (e.g., display 500 (FIG. 5)). In some embodiments, the listing with the highest rating may be displayed more prominently (e.g., listing 502 (FIG. 5)) than the other listings (e.g., listing 504, 506, and 508 (FIG. 5), which have lower ratings.

It is contemplated that the steps or descriptions of FIG. 16 may be used with any other embodiment of this disclosure. In addition, the steps and descriptions described in relation to FIG. 16 may be done in alternative orders or in parallel to further the purposes of this disclosure. For example, each of these steps may be performed in any order or in parallel or substantially simultaneously to reduce lag or increase the speed of the system or method.

Figure 17:
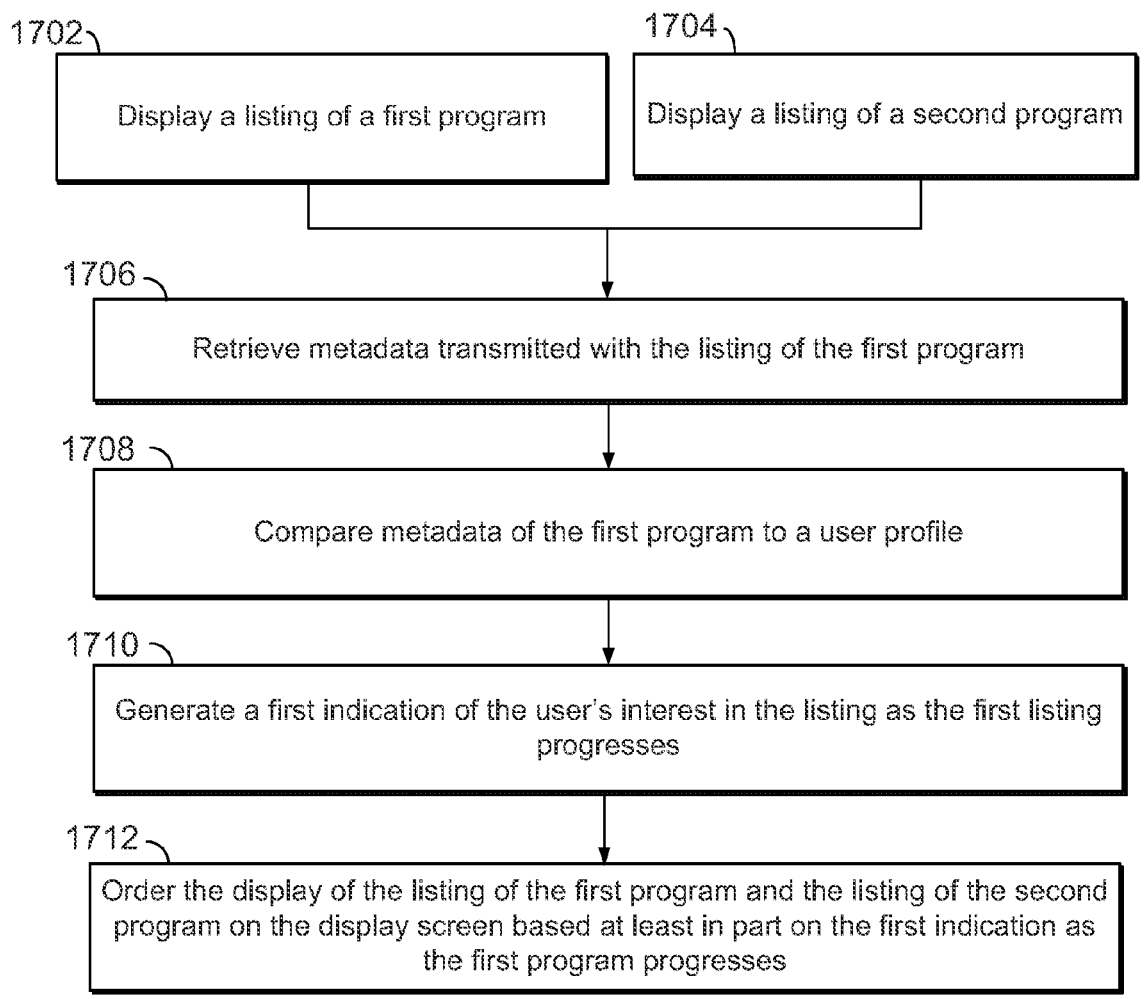
FIG. 17 is a flow-chart of illustrative steps involved in using a media guidance application to display media content listings in accordance with some embodiments of the disclosure.

FIG. 17 is a flow-chart of illustrative steps involved in using a media guidance application to display media content options using an indication of a user's interest in the listing in accordance with some embodiments of the disclosure. In some embodiments, the rating of a particular listing may incorporate rating systems produced by third parties and/or ratings generated by the media guidance application using a user profile. The use of a user profile to determine the interest of a user in a particular listing is described in process 1700. It should be noted that process 1700 or any step thereof, could be displayed on, or provided by, any of the devices shown in FIGS. 3-4. In addition, process 1700 or any step thereof, may be performed in real-time. For example, process 1700 may be executed by control circuitry 304 (FIG. 3) as instructed by the media guidance application.

At step 1702, process 1700 displays a listing a first program, and at step 1704, process 1700 displays a second listing. In some embodiments, the media guidance application transmits instructions to generate the first listing and the second listing of the program. The media guidance application may be located locally at user equipment 402, 404, and/or 406 (FIG. 4) or may be located at media guidance data source 418 (FIG. 4) and accessed via the communications network 414 (FIG. 4). In some embodiments, the display screen on which the first listing and the second listing are displayed (e.g., display 500 (FIG. 5) and/or video mosaic display 200 (FIG. 2)) may be located at user equipment 402, 404, and/or 406 (FIG. 4).

At step 1706, process 1700 retrieves real-time data or metadata transmitted with the first listing of the program. The data may be retrieved from the media guidance data source 418 (FIG. 4) or the user equipment 402, 404, and/or 406 (FIG. 4). In some embodiments, data may also be retrieved from any device accessible via the communication network 414 (FIG. 4). For example, additional data regarding the listing of the first program may be transmitted from a third party source. The real-time data or metadata transmitted with the listing may arrive in a separate file, or may be included with the transmitted listing (e.g., the data may be transmitted in data structure 900 (FIG. 9)). In some embodiments, the media guidance application retrieves and interprets the real-time data or metadata transmitted with the listing. For example, process 1700 may analyze a data structure transmitted with each listing (e.g., data structure 900 (FIG. 9)) to produce a data structure that may be processed by the media guidance application (e.g., array 1002 (FIG. 10A)).

At step 1708, process 1700 may compare the real-time data or metadata associated with the listing of the first program to a user profile. In some embodiments, as described above, the user profile may include a compilation of the user's interests. The user profile may indicate that particular content (as retrieved in step 1706) of the first program is of particular interest to the user. For example, if the listing relates to a particular actress (as determined by data retrieved in step 1706), process 1700 may compare the name of the actress to user profile data corresponding to the actresses that the user enjoys. The user profile may be organized into a data structure (e.g., data structure 1030 (FIG. 10C)). In some embodiments, the data structure may be a lookup table, organized by various traits or characteristics of a program (e.g., actor/actress names, movie names, producer names, budgets, ratings, genre, critical reviews, recommendations, etc.). The data structure may be located on the media guidance data source 418 (FIG. 4) or the user equipment 402, 404, and/or 406 (FIG. 4).

At step 1710, process 1700 generates a first indication of the user's interest in the listing of the first program. In some embodiments, process 1700 may calculate a value of the indication of the user's interest based on assigning a value to the presence of the indication in a data structure (e.g., data structure 1030 (FIG. 10C)). By incorporating process 1100 (FIG. 11), into process 1700, the media guidance application may give an numerical value to the level of interest a user is likely to have in a particular program at a particular point in the progress of the program. For example, the data retrieved in step 1706 may indicate that a particular actress is about to appear during the program. The media guidance application may compare the name of the actress to the names of actresses in the user profile. The media guidance application may then generate an indication of the user's interest in the listing based on the presence, or lack thereof, of the actress' name in the user profile. In some embodiments, the media guidance application may also assign a numerical value to the indication.

At step 1712, process 1700 order the display of the listing of the first program and the listing of the second program on the display screen based at least in part on the first indication as the first program progresses. For example, if the first indication indicates (e.g., the first indication has a high value) that a particular point of a program (e.g., a sudden plot-twist) is significantly likely based on the data associated with the listing as retrieved in step 1706, the media guidance application may display the first program more prominently than the second program. For example, in some embodiments, the listing with the lowest likelihood may be displayed more prominently (e.g., listing 502 (FIG. 5)) than the other listings (e.g., listing 504, 506, and 508 (FIG. 5)).

It is contemplated that the steps or descriptions of FIG. 17 may be used with any other embodiment of this disclosure. In addition, the steps and descriptions described in relation to FIG. 17 may be done in alternative orders or in parallel to further the purposes of this disclosure. For example, each of these steps may be performed in any order or in parallel or substantially simultaneously to reduce lag or increase the speed of the system or method.

Figure 18:
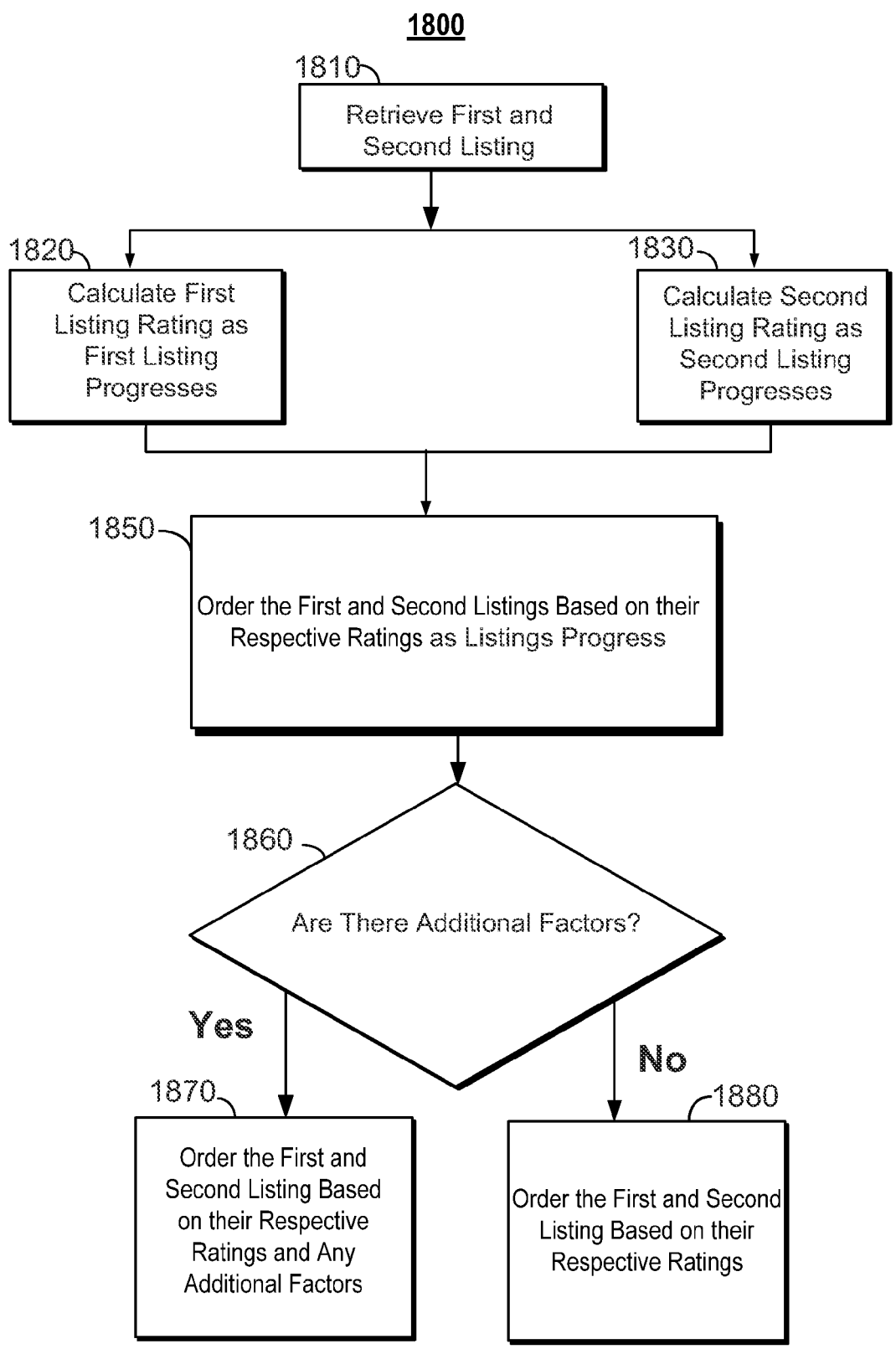
FIG. 18 is a flow-chart of illustrative steps involved in using a media guidance application to display media content listings and to order the display of listings in accordance with some embodiments of the disclosure.

FIG. 18 is a flow-chart of illustrative steps involved in using a media guidance application to display media content options and order the display of listings in accordance with some embodiments of the disclosure. It should be noted that process 1800 or any step thereof, could be displayed on, or provided by, any of the devices shown in FIGS. 3-4. In addition, process 1800 or any step thereof, may be performed in real-time. For example, process 1800 may be executed by control circuitry 304 (FIG. 3) as instructed by the media guidance application.

FIG. 18 describes process 1800, which illustrates an example of ordering non-scored contest listings based on the particular ratings of the listings. At step 1810, process 1800 retrieves data transmitted with the first listing and the second listing. The data may be retrieved from the media guidance data source 418 (FIG. 4) or the user equipment 402, 404, and/or 406 (FIG. 4). In some embodiments, data may also be retrieved from any device accessible via the communication network 414 (FIG. 4). For example, additional data regarding the listing may be transmitted from a third party source. The data transmitted with the listing may arrive in a separate file, or may be included with the transmitted listing (e.g., the data may be transmitted in the metadata of the listing). In some embodiments, the media guidance application retrieves and interprets the data associated with the listing. For example, process 1800 may analyze a data structure transmitted with each listing (e.g., data structure 900 (FIG. 9)) to produce a data structure that may be processed by the media guidance application (e.g. array 1002 (FIG. 10A)).

At step 1820, process 1800 may calculate a rating of the first listing as the content associated with the first listing progresses. At step 1830, process 1800 may calculate a rating of the second listing as the content associated with the second listing progresses. In some embodiments, process 1800 may use some, all, or a variation of process 1600 (FIG. 16) and process 1700 (FIG. 17). For example, if the listing relates to a non-scored contest, process 1800 may compare the data received in step 1810 to ratings of similar non-scored contest listings. The data may be arranged in a data structure (e.g., data structure 1030 (FIG. 10C), which includes information regarding the type, rating and/or user preference of particular listings. Calculating a rating in steps 1820 and 1330, may occur on the media guidance data source 418 (FIG. 4) or the user equipment 402, 404, and/or 406 (FIG. 4). In some embodiments, calculating a rating may also occur on a device accessible via the communication network 414 (FIG. 4), which then transmits the rating to the media guidance data source 418 (FIG. 4) or the user equipment 402, 404, and/or 406 (FIG. 4).

At step 1850, process 1800 may order the first and second listings based on their respective ratings as the listings progress. For example, the listings may be ordered as discussed in relation to FIG. 12A. At step 1860, process 1800 determines whether or not there are additional factors. For example, a listing may feature an actor or actress that is of interest to the user based on the user's profile. Moreover, the actor or actress may be appearing at the particular moment in the content associated with the listing. Therefore, the listing may be displayed more prominently than other listings in the display (e.g., display 500 (FIG. 5)). In another example, a specific incident or scene of a listing (e.g., an award-winning singing solo during a reality television show), which has been discussed and/or referenced in other media (e.g., internet chat-rooms and/or critical reviews) may be appearing. Based on the user's profile, the user may be interested in viewing the scene. Therefore, the listing may be displayed more prominently than other listings in the display (e.g., display 500 (FIG. 5)).

In another example, a listing may be a news program. The data transmitted with the listing may indicate that the news program is about to cover a particular story, which may be of interest to the user based on the user's profile. Therefore, the listing may be displayed more prominently than other listings in the display (e.g., display 500 (FIG. 5)).

If there are not additional factors, process 1800 proceeds to step 1880 and the first and second listing are ordered based on their respective ratings. If there are additional factors, process 1800 proceeds to step 1870 and orders the first and second listing based on their respective ratings and any additional factors. In some embodiments, the ordered listing of step 1870 and/or step 1880 may be displayed on user equipment 402, 404, and/or 406 (FIG. 4).

It is contemplated that the steps or descriptions of FIG. 18 may be used with any other embodiment of this disclosure. In addition, the steps and descriptions described in relation to FIG. 18 may be done in alternative orders or in parallel to further the purposes of this disclosure. For example, each of these steps may be performed in any order or in parallel or substantially simultaneously to reduce lag or increase the speed of the system or method.

Figure 19:
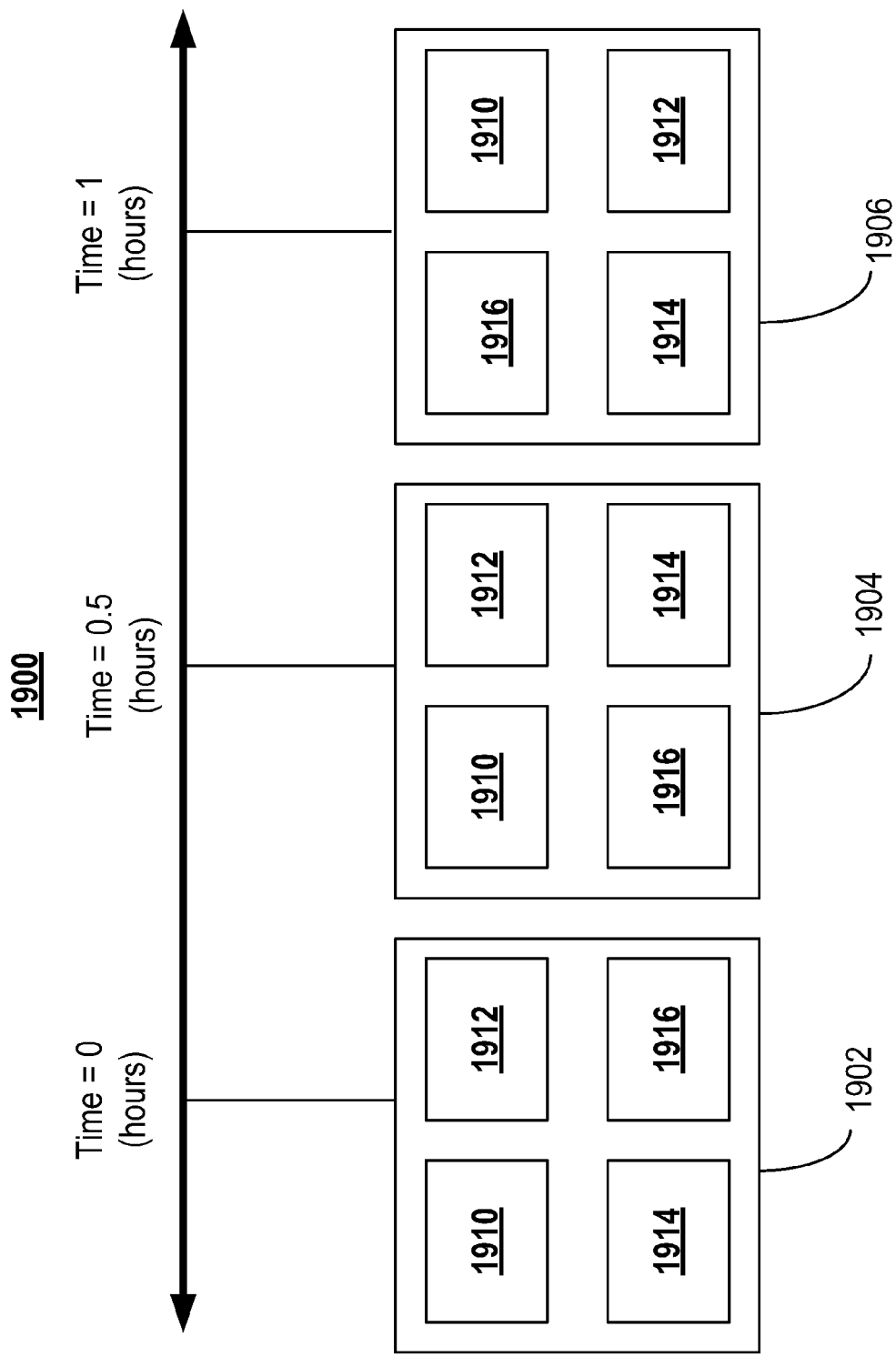
FIG. 19 is a timeline used to describe some embodiments of a media guidance application used to display media content listings in accordance with some embodiments of the disclosure.

FIG. 19 is a timeline used to describe some embodiments of a media guidance application used to display media content options in accordance with some embodiments of the disclosure. For example, timeline 1900 may show display 200 (FIG. 2), which may display listings 206, 208, 210, and 212 (FIG. 2) as shown on user equipment 402, 404, and/or 406 (FIG. 4).

Timeline 1900 displays three time periods, time 1902, time 1904, and time 1906. Time 1902 represents the initial display (e.g., display 200 (FIG. 2)) after activation of the media guidance application. Time 1904 represents the display (e.g., display 200 (FIG. 2)) of the media guidance application half an hour after time 1902. Time 1906 represents the display (e.g., display 200 (FIG. 2)) of the media guidance application one hour after time 1902.

At each of time 1902, time 1904, and time 1906, timeline 1900 shows a display with listings 1910, 1912, 1914, and 1916. Listings 1910, 1912, 1914, and 1916 are organized based on the likely interest of the user. The order of the listings on the display (e.g., display 200 (FIG. 2)) are ordered left to right in two rows. For example, upon initial activation at time 1902, listing 1910 is the listing identified by the media guidance application as of the most interest. For example, the media guidance application may determine that listing 1910 has the current highest indication of the user's interest. Listing 1912, upon initial activation at time 1902, is the listing identified by the media guidance application as of the second-most interest. Listing 1914, upon initial activation at time 1902, is the listing identified by the media guidance application as of the third-most interest. Listing 1916, upon initial activation at time 1902, is the listing identified by the media guidance application as of the least interest.

In some embodiments, the order of listings 1910, 1912, 1914, and 1916 may depend on information received from other media or sources. For example, the media guidance application may determine that information relating to a listing (e.g., a surprise guest star, a sudden change in score, a surprise plot-twist) has recently appeared on a user's social media feed; that particular content relating to a listing is receiving a large amount of hits, views, or comments via the internet; or that several of the user's friends (e.g., as indicated by a social network) are watching a particular listing. In each of these cases, the media guidance application may adjust the positions of 1910, 1912, 1914, and 1916 based on these additional factors as discussed in FIG. 13.

At time 1904, the media guidance application determines that listing 1916 has become more interesting than listing 1914. For example, the ratings of listing 1916 may have experienced a ratings increase such that the current ratings of listing 1916 are higher than the current ratings of listing 1914. In another example, the data transmitted with listing 1916 may info the media guidance application that a guest celebrity is about to make an appearance on listing 1916; therefore, listing 1916 may now be of more interest than listing 1914. In another example, the data transmitted with listing 1916 may inform the media guidance application that listing 1916 may have begun a particularly interesting portion of its program (e.g., the elimination of one or more contestants). In another example, the data transmitted with listing 1916 may inform the media guidance application that listing 1916 has experienced an outcome altering occurrence (e.g., the scoring of one or more points by a contestant in a scored contest). In each of these examples, the media guidance application may determine that the user is more likely to be interested in listing 1916 than listing 1914. In some embodiments, determining that the user is more likely to be interested in listing 1916 than listing 1914 may be achieved by calculating a likelihood of an outcome, determining a sudden surge in a rating of the listing, generating an indication of a user's interest, and/or any other suitable method.

At time 1906, listing 1916 is now the listing identified by the media guidance application as of the most interest. Listing 1910 is now the listing identified by the media guidance application as of the second-most interest. Listing 1914 is now the listing identified by the media guidance application as of the third-most interest. Listing 1912 is now the listing identified by the media guidance application as of the least interest. For example, the ratings of listing 1916 may have experienced a ratings increase such that the current ratings of listing 1916 are higher than the current ratings of listings 1910, 1912 and 1914. The current ratings of listing 1910 may still be greater than the current ratings of listings 1912 and 1914, and the current ratings of listing 1914 may be greater than the current ratings of 1912.

In some embodiments, one or more of the listings 1910, 1912, 1914 and/or 1916 may be displayed more prominently than the remaining listings. For example, in some embodiments, a listing may appear larger (e.g., listing 502 (FIG. 5)) than the other listings (e.g., listing 504, 506, and 508 (FIG. 5)).

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for displaying a plurality of listings for scored contests on a display screen using a media guidance application, comprising:
    generating for display a listing of a first scored contest having a first score;
    generating for display a listing of a second scored contest having a second score;
    processing a real-time data feed associated with the first scored contest to determine the first score at a point of progress of the first scored contest;
    extrapolating a first likelihood that the first scored contest will have an outcome based, at least in part, on a cross-referencing of the first score with outcome determination criteria, wherein cross-referencing the first score with outcome determination criteria comprises retrieving a percentage of historical scored contests of a corresponding type as the first scored contest with a corresponding score as the first scored contest at a corresponding point of progress as the first scored contest that resulted in the outcome;
    ordering the display of the listing of the first scored contest and the listing of the second scored contest on the display screen based, at least in part, on the likelihood;
    extrapolating a second likelihood that the second scored contest will have the outcome based, at least in part, on a cross-referencing of the second score with the outcome determination criteria;
    comparing the first likelihood to the second likelihood; and
    in response to determining the first likelihood is greater than the second likelihood, demoting the listing of the first scored contest in the order displayed on the display screen.

2. The method of claim 1, further comprising retrieving historical outcomes of historical scored contests from a lookup table.

3. The method of claim 1, wherein outcome determination criteria comprises a score threshold of a scored contest of the corresponding type as the first scored contest at the corresponding point of progress of the first scored contest.

4. The method of claim 3, further comprising determining whether the first score exceeds the score threshold.

5. The method of claim 1, further comprising detecting an occurrence of an event having an affect on the likelihood of the outcome.

6. The method of claim 1, further comprising displaying a video asset for each listing.

7. The method of claim 1, further comprising retrieving a type indicator from the first listing.

8. A system for displaying a plurality of listings for scored contests on a display screen using a media guidance application, comprising a processor configured to:
    generate for display a listing of a first scored contest having a first score;
    generate for display a listing of a second scored contest having a second score;
    process a real-time data feed associated with the first scored contest to determine the first score at a point of progress of the first scored contest;
    extrapolate a first likelihood that the first scored contest will have an outcome based, at least in part, on a cross-referencing of the first score with outcome determination criteria, wherein cross-referencing the first score with outcome determination criteria comprises retrieving a percentage of historical scored contests of a corresponding type as the first scored contest with a corresponding score as the first scored contest at a corresponding point of progress as the first scored contest that resulted in the outcome;
    order the display of the listing of the first scored contest and the listing of the second scored contest on the display screen based, at least in part, on the first likelihood;
    extrapolate a second likelihood that the second scored contest will have the outcome based, at least in part, on a cross-referencing of the second score with the outcome determination criteria;
    compare the first likelihood to the second likelihood; and
    in response to determining the first likelihood is greater than the second likelihood, demote the listing of the first scored contest in the order displayed on the display screen.

9. The system of claim 8, wherein the processor is further configured to retrieve historical outcomes of historical scored contests from a lookup table.

10. The system of claim 8, wherein outcome determination criteria comprises a score threshold of a scored contest of the corresponding type as the first scored contest at the corresponding point of progress of the first scored contest.

11. The method of claim 10, wherein the processor is further configured to determine whether the first score exceeds the score threshold.

12. The system of claim 8, wherein the processor is further configured to detect an occurrence of an event having an affect on the likelihood of the outcome.

13. The system of claim 8, wherein the processor is further configured to display a video asset for each listing.

14. The system of claim 8, wherein the processor is further configured to retrieve a type indicator from the first listing.

* * * * *